US008992308B2

(12) United States Patent
Baerlocher

(10) Patent No.: US 8,992,308 B2
(45) Date of Patent: Mar. 31, 2015

(54) GAMING SYSTEM HAVING MODIFIED PLAYER WAGERS

(71) Applicant: Aruze Studios California, LLC, Truckee, CA (US)

(72) Inventor: Anthony Baerlocher, Reno, NV (US)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/627,864

(22) Filed: Sep. 26, 2012

(65) Prior Publication Data

US 2014/0087843 A1 Mar. 27, 2014

(51) Int. Cl.
*G06F 17/00* (2006.01)
*G07F 17/32* (2006.01)

(52) U.S. Cl.
CPC ........ *G07F 17/3244* (2013.01); *G07F 17/3267* (2013.01)
USPC ........................................................... 463/25

(58) Field of Classification Search
CPC .. G07F 17/32; G07F 17/3244; G07F 17/3267
USPC ...................................................... 463/16–25
See application file for complete search history.

(56) References Cited

U.S. PATENT DOCUMENTS

| | | | | |
|---|---|---|---|---|
| 6,443,452 | B1 | 9/2002 | Brune | |
| 7,300,351 | B2 | 11/2007 | Thomas | |
| 7,591,726 | B2 | 9/2009 | Baerlocher et al. | |
| 7,758,421 | B2 | 7/2010 | Hornik et al. | |
| 7,785,196 | B2 | 8/2010 | Baerlocher et al. | |
| 7,922,578 | B2 * | 4/2011 | Okuniewicz | 463/25 |
| 7,985,133 | B2 | 7/2011 | Baerlocher et al. | |
| 8,147,319 | B2 * | 4/2012 | Hornik et al. | 463/25 |
| 2003/0162588 | A1 | 8/2003 | Brosnan et al. | |
| 2006/0154722 | A1 | 7/2006 | Walker et al. | |
| 2007/0254733 | A1 * | 11/2007 | Hornik et al. | 463/20 |
| 2008/0026822 | A1 | 1/2008 | Walker et al. | |
| 2008/0214258 | A1 | 9/2008 | Brosnan et al. | |
| 2009/0124351 | A1 | 5/2009 | DeWaal et al. | |
| 2010/0113138 | A1 | 5/2010 | Baerlocher et al. | |
| 2011/0053680 | A1 * | 3/2011 | Acres | 463/25 |
| 2011/0212764 | A1 | 9/2011 | Baerlocher et al. | |

FOREIGN PATENT DOCUMENTS

AU 2007203506 A1 8/2008

* cited by examiner

*Primary Examiner* — Ronald Laneau
(74) *Attorney, Agent, or Firm* — Watson Rounds; Marc D. Foodman

(57) ABSTRACT

A system apparatus and method which provides a player of a gaming system the ability to modify the wager of a future play of the gaming system. The system apparatus and method may also allow a player of the gaming system to exchange the ability to modify a future wager for a reduced amount of cashable credits. A system apparatus and method which provides a player of a non-wagering or social gaming system the ability to modify a future offer to play the non-wagering or social gaming system is also contemplated.

24 Claims, 16 Drawing Sheets

GAMING SYSTEM HAVING MODIFIED PLAYER WAGERS

COPYRIGHT NOTICE

At least a portion of this patent document contains material subject to copyright protection. The copyright owner has no objection to the facsimile reproduction by anyone of this patent document, exactly as it appears in the United States Patent and Trademark Office patent files or records, but otherwise reserves all copyright rights and protections.

BACKGROUND

Gaming machines, such as slot machines, video poker machines, and other mechanical, electromechanical, and electronic machines used to determine and/or display wagering game outcomes have become an integral part of the worldwide gambling industry. Often, the commercial success of such gaming machines is heavily reliant on their methods of determining the gaming outcomes, and their methods of displaying the gaming outcomes. These methods must be statistically reliable, but typically must also be easily understood by a player, and entertaining, in order to prove successful.

More recently, the games historically found on gaming machines have been employed away from the casino in non-gambling environments, such as on-line and mobile representations, where no money is wagered, but instead non-redeemable credits are used to play such games. These non-redeemable credits are sometimes provided to a player for free, but in some instances, must be purchased by a player in order to be utilized to play a game. In such formats, as money is not being wagered, the games typically do not have to prove statistically reliable. However, it is strongly believed that the commercial success of such implementations is still reliant on their ease of understanding, and their entertainment value.

One particular problem that gaming machine designers have historically encountered is creating a bonus-type event while still requiring a player to wager in order to continue playing. Historically, bonus games are provided to the player in such a manner that the player is not required to wager for a period of time while their bonus game or games are resolved, and typically until after a bonus award is provided to the player based on such resolution. From an operator perspective, this may be viewed as commercially undesirable, primarily because during this time, the gaming machine can only be in a negative equity mode, or in other words, the gaming machine can only be paying out awards while not accepting any offsetting wagers. From a gaming machine designer aspect, providing bonus games where the player is not allowed to wager is commonly understood as an easier design process as you remove a significant variable from the equation, which is a player's game-to-game wager pattern, which can fluctuate in such a manner as to not be statistically predictable. Such a fluctuation can significantly impact any statistical reliability analysis that is typically required in order to produce a commercially viable gaming machine or gaming system.

SUMMARY

In one embodiment of the present disclosure, a gaming system provides at least one processor, and least one player input device, at least one memory device, and at least one display device, wherein an event associated with a play of a game on the gaming system causes the at least one processor to execute instructions stored on the at least one memory device to work with the at least one input device and the at least one display device to accrue a modifier to be applied to a future wager on the gaming system, which herein may be referred to as a future wager modifier.

In one embodiment of the present disclosure, a gaming system provides at least one processor, and least one player input device, at least one memory device, and at least one display device, wherein an event associated with a play of a game on the gaming system causes the at least one processor to execute instructions stored on the at least one memory device to work with the at least one input device and the at least one display device to apply at least a portion of an accrued future wager modifier to a wager placed by a player to effectively modify the player's wager for a subsequent or other future play of a game on the gaming system.

In one embodiment of the present disclosure, a gaming system provides at least one processor, and least one player input device, at least one memory device, and at least one display device, wherein an event associated with a play of a game on the gaming system causes the at least one processor to execute instructions stored on the at least one memory device to work with the at least one input device and the at least one display device to allow a player of the gaming system to exchange at least a portion of an accrued future wager modifier for a, at least perceptually, reduced amount of cashable credits.

In a further embodiment, a gaming method is provided wherein an event associated with a play of a game will accrue a modifier to be applied to a future offer by the player to play the game. Such an offer may be in the form of non-redeemable credits, or may be in the form of a wager.

In one embodiment of the present disclosure, a gaming method is provided wherein an event associated with a play of a game will cause at least a portion of an accrued modifier to effectively modify the player's offer to play a subsequent or other future play of a game. Such an offer may be in the form of non-redeemable credits, or may be in the form of a wager.

It is therefore an advantage of the present disclosure to provide a gaming system and method which provides a player a bonus-type event, but requires the player to continue to actively play in order to recognize the full value of the bonus-style event.

It should be understood that various changes and modifications to the presently preferred embodiments described herein will be apparent to those skilled in the art. Such changes and modifications can be made without departing from the spirit and scope of the present subject matter and without diminishing its intended advantages.

DETAILED DESCRIPTION

Figure 1:
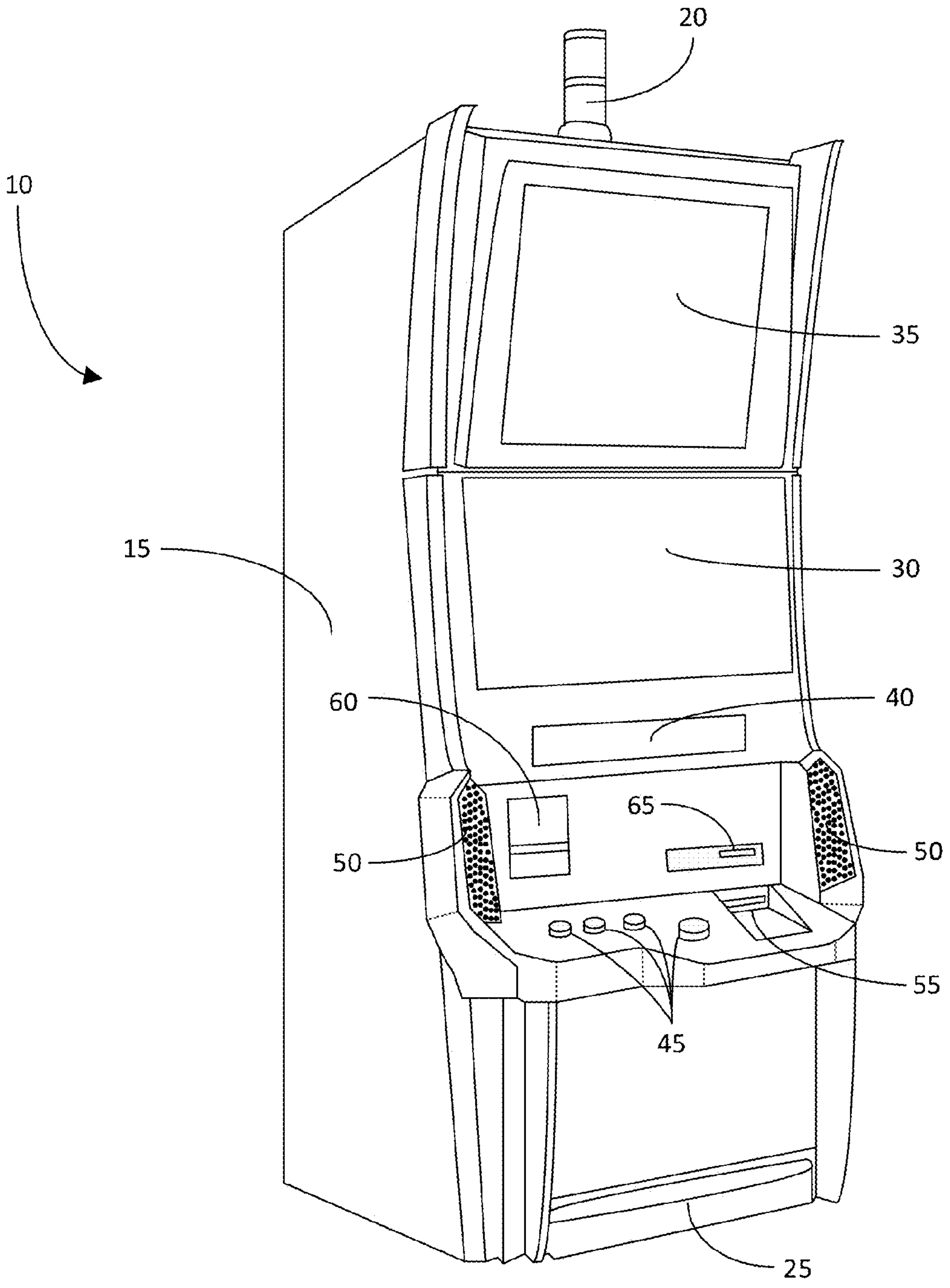
FIG. 1 is a perspective view of a gaming machine, in accordance with an embodiment of the present invention.

Referring to FIG. 1, a typical gaming machine 10 is shown. Gaming machines are sometimes referred to as a gaming system, slot machines, electronic gaming machines (EGM's), poker machines, pokies, video lottery terminals (VLT's), gaming terminals, video slot machines, and video gaming machines, and all such machines typically operate in a similar manner in that a player places something of value at risk on an outcome that is unknown and uncertain to the player, and the machine displays the associated outcome, thereby informing the player of the resolution associated with their placing said something at risk.

Gaming machine 10 includes cabinet 15 which typically houses sensitive components of the gaming machine 10. Cabinet 15 can be made from wood, metal, or any other structurally secure material. The sensitive components housed within the cabinet could include electronics, money handling devices, computing devices, communication devices, and other such components that a gaming machine manufacturer does not wish public access to.

Gaming machine 10 is shown in FIG. 1 with a candle 20. Such candles can be utilized by casinos to communicate machine malfunctions or other issues associated with gaming machine 10 to floor personnel who attend to the casino floor. Typically, dependent on the issue with the gaming machine 10, the candle 20 can be light up in different colors, which help floor personnel discern what the issue is with the gaming machine 10.

Gaming machine 10 is also shown with a coin tray 25. More recently, such coin trays are obsolete as most gaming machines do not accept coins or have an associated coin hopper to dispense coins. However, coin trays such as coin tray 25 can still be part of gaming machines for aesthetic purposes, or for simplification of manufacturing for those instances where a gaming machine is required to dispense coins. In one embodiment, coin tray 25 can be lit by multi-colored lights to help attract players to gaming machine 10.

Gaming machine 10 has a primary display 30, which is utilized to display the primary game. The primary game display can be a mechanical or electromechanical display, such as a set of physical reels, or it can be a video display, such as a liquid crystal display (lcd), a plasma display, an electroluminescent (EL) display, an organic light emitting diode (OLED) display, a cathode ray tube (CRT) display, a surface-conduction electron-emitter display (SED), a digital light projection (DLP) display, a polymer light-emitting diodes (PLED) display, an LCD projection display, any combination thereof, or any other display capable of displaying video. It is also contemplated that primary display 30 has an associated touchscreen which overlays the primary display 30, which would allow a player to touch portions of the screen in order to input selections or other commands. Use of such touchscreens are common on gaming machines.

It is further contemplated that primary display 30 can be a traditional 2-D display, or a 3D display. It is also contemplated that in combining two or more displays into primary display 30, that at least the display closest to the player would have portions which are transparent or translucent in order to enable viewing of a display further from the player. In one example of such an embodiment, the display closest to the player is an LCD display, which is aligned in front of mechanical reels, which together provides a player with the experience of both video and traditional mechanical reels in a play of the gaming machine 10. In another example of such an embodiment, two or more LCD displays are provided, which can be utilized to present a 3-D display to the player.

Gaming machine 10 also includes a secondary display 35, which can be the same type of display as primary display 30, or can be any other type of display as identified above in relation to the primary display 30. Secondary display 35 can be utilized to provide information to the player, such as paytable information or information on a particular bonus game, or it can be utilized to play a portion of a game, such as a bonus game. It is also contemplated that secondary display 35 could be utilized to provide additional information related to the primary game of gaming machine 10. For example, it could display the results of the primary game, it could show the payline layout, it could identify any wins in the primary game, or any other information that a gaming machine manufacturer thinks might help the player enjoy their experience.

Also included with gaming machine 10 is information display 40. It is contemplated that such a smaller display could be utilized to provide condensed information to a player, such as information relating to the current play of the game. For example, information display 40 could display the number of paylines wagered on, the wager per line, and the total bet for a play of the game. Again, it is contemplated that information display could be the same type of display as primary display 30, could be an LED dot matrix type of display, or could be any other type of display as identified above in relation to the primary display 30. It should also be understood that while gaming machine 10 is being shown with 3 distinct displays, primary display 30, secondary display 35, and information display 40, that more or less displays could be utilized without departing from the scope or spirit of the present disclosure. For example, it is contemplated that gaming machine 10 could have only a single display.

It is contemplated that gaming machine 10 has one or more buttons 45. Buttons 45 could be utilized by a player to select components of their game, such as the amount of their wager or how to allocate their wager within the game, and allow them to initiate the play of the game, for example by selecting a "Spin" button or other play initiating button. It is contemplated that buttons 45 can be physical buttons or virtual buttons, such as a touchscreen input, or a combination thereof. In one embodiment, buttons 45 include video displays, such as an LCD, which in turn allows the gaming machine 10 to be converted to a different title or style of game without having to replace buttons 45.

Gaming machine 10 also includes speakers 50. It is contemplated that speakers 50 can work independently of each other, work in coordination with each other, work in coordination with other speakers, for example speakers located in a player seat associated with gaming machine 10, work as part of a surround sound system, or any combination thereof.

Gaming machine 10 also includes a currency acceptor 55. In one embodiment, currency acceptor 55 is a bill acceptor which accepts paper money. In another embodiment, currency acceptor is a coin acceptor which accepts coins. In still another embodiment, gaming machine 10 includes more than one currency acceptor 55. In another embodiment, currency acceptor 55 can accept multiple denominations of currency, or even currencies from multiple countries. In still another embodiment, currency acceptor can accept a ticket or similar indicium that is distributed by a casino or another gaming machine, which indicates an amount of currency available for use on gaming machine 10. In a further embodiment, currency acceptor 55 can accept credit cards, debit cards, or other instruments to initiate an electronic funds transfer. It is also contemplated that instead of a currency acceptor 55, the gaming machine 10 provides another means to allow a player to access money in order to wager on a play of the game. For example, the player may enter a PIN in order to access an account they have, either with a bank or the casino itself, and upon entering the PIN and other information, certain amount of funds are transferred to the gaming machine 10 or otherwise allowed to be wagered via gaming machine 10.

The gaming machine 10 of FIG. 1 is also shown with a ticket printer 60, which is utilized to cash money out of gaming machine 10. It is common now that gaming machines accept currency, but will only provide a ticket upon cashout, and then the holder of the ticket must take the ticket to the cashier's cage or a ticket redemption kiosk in order to obtain the currency indicated by the ticket. For gaming machine 10, it is contemplated that after a player elects to cashout by selecting an appropriate button 45, printer 60 prints out a tickets which indicates the amount of currency the player elected to cashout, and the player can then take the ticket and insert it into another gaming machine, or visit a cashier's cage or a ticket redemption kiosk to exchange the ticket for currency.

Gaming machine 10 also includes a player tracking device 65. It is contemplated that gaming machine 10 could include a visibly distinct player tracking device 65, or a visually integrated player tracking device that utilizes a portion of the primary display 30 and associated touchscreen in order to interact with a player. In practice, a player makes their identity known to the player tracking device 65, either actively by inserting a player tracking card and/or entering a PIN into player tracking device 65, or passively by utilizing a location device, such as a radio frequency identification (RFID) or a Bluetooth device which can transmit information short distances. Thereafter, the player tracking device 65 communicates over a network with a casino tracking system (not shown) to track a player's play, and potentially offer awards or other services to the player, often through the same player tracking device 65. The player tracking device 65 can also display player status information back to the player, or other information based on or otherwise related to a player's play history and/or status, including awards earned by a player. It is also contemplated that the networked player tracking device 65 can be utilized to offer other services to players, such as the ordering of drinks, or making promotional offers to a player, perhaps working in coordination with ticket printer 60 to do so.

Figure 2:
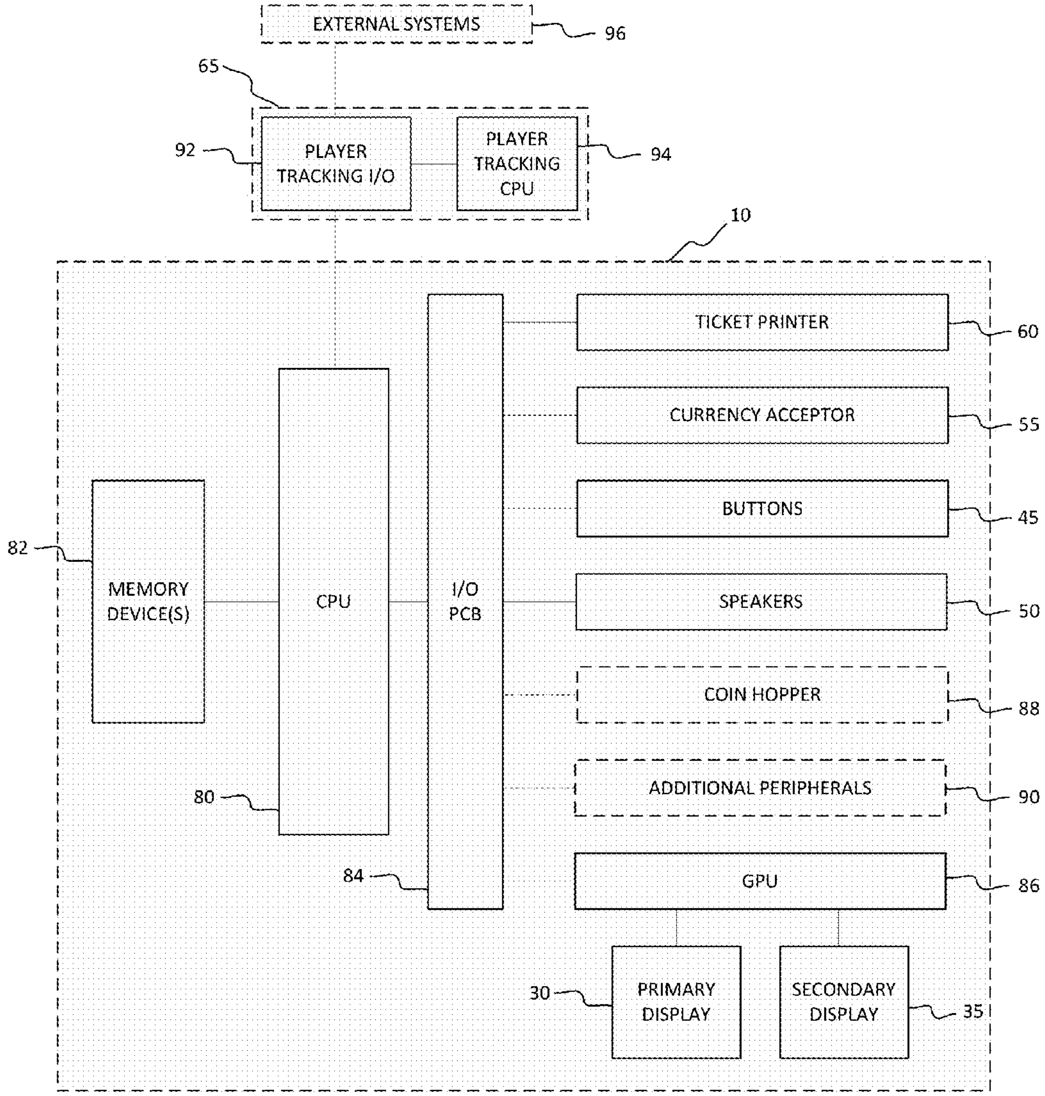
FIG. 2 is schematic view of a gaming system, in accordance with an embodiment of the present invention.

FIG. 2 is a schematic diagram of a gaming system in accordance with one embodiment of the present disclosure. In this embodiment, gaming machine 10 utilizes a computer processing unit (CPU) 80, such as a processor, a microprocessor, or the like. CPU 80 can perform arithmetic and logical operations, and also extract instructions from memory device(s) 82 and decodes and executes them. Alternatively, it is contemplated that instead of CPU 80, an array processor or vector processor has multiple parallel computing elements, which utilizes a distributed computing model, to perform such arithmetic and logical operations.

Memory device(s) 82 can include one or more distinct types of memory devices, such as random access memory (RAM) or dynamic RAM (DRAM), which can include non-volatile RAM (NVRAM), magnetic RAM (MRAM), ferro-electric RAM (FeRAM) and other forms as commonly understood in the computing industry. In one embodiment, the memory device(s) 82 includes read only memory (ROM), which may, for example, store regulatory-sensitive instructions for gaming machine 10. In one embodiment, the memory device(s) 82 includes flash memory and/or EEPROM (electrically erasable programmable read only memory). Any other suitable magnetic, optical and/or semiconductor memory may operate in conjunction with the gaming device 10 disclosed herein.

CPU 80 is communicatively connected to at least one input/output printed circuit board (I/O PCB) 84 which operates as an electrical interface between CPU 80 and various peripherals of the gaming machine 10. FIG. 2 further illustrates various peripherals, including ticket printer 60, currency acceptor 55, buttons 45, speakers 50, as well as possible peripherals coin hopper 88, and other additional peripherals 90. Also illustrated is a graphic processing unit (GPU) 86, which works in coordination with CPU 80 to control the primary display 30 and secondary display 35, and causes them to display various aspects of a game.

Also communicatively connected to CPU 80 is a player tracking device 65. It is contemplated that the player tracking device 65 includes a distinct player tracking input/output (I/O) 92 and player tracking CPU 94, as well as associated player tracking memory (not shown). In one embodiment, it is contemplated that player tracking device 65 could have a direct line of communication with ticket printer 60. In such an embodiment, the player tracking device 65 could then cause ticket printer 60 to print out promotional tickets without having to first communicate with gaming machine CPU 80, which may be desirable from a regulatory view. FIG. 2 also illustrates that gaming machine 10 is communicatively connected to external systems 96, which could include one or more of an accounting system, player tracking system, player bonusing system, player assistance system, server-based gaming system or other game content management system, wide area network (WAN), local area network (LAN), the internet, or other communication systems.

Games offered on gaming machines such as gaming machine 10 can be widely varied and diverse. However, all such games typically must meet very stringent requirements, which assure their fairness and perhaps even their appearance of fairness. Generally speaking, games must return to players, in the form of monetary awards, on average, somewhere between 75% and 100% of all wagers accepted, which is referred to as payback percentage. Specific payback requirements are specific to each of the hundreds of regulated gaming jurisdictions worldwide, but as a general manner, fall within such a range, and must be statistically verifiable over numerous plays. Many such jurisdictions have additional requirements related to how a game outcome is determined, whether the outcome is completely random, primarily random, unpredictable by a player, or to what affects a player's skill level can have on an outcome. It is the requirement to meet such stringent regulations that truly limit the features that can be designed into a game for gaming machine 10.

Some of the more popular game styles involve distinct reels of symbols which spin, and then stop after which the symbols which are viewable are evaluated, often in relation to one or more paylines, to determine if an arrangement of the viewable symbols meets predefined relationship criteria which define wins, which has associated awards. Variations of this example includes changes to the layout, number, type, and location of reels, the associated symbols, and paylines, how the predefined relationship criteria are applied, and additional functionality applied to certain symbols, such as wild symbols, multiplier symbols, expanding symbols, stacked symbols, multi-symbols, scatter symbols, and combinations thereof.

More recently, games appearing similar to such casino games are becoming more prevalent through social media outlets, such as Facebook® (registered trademark of Facebook, Inc.), where they are played for non-redeemable or non-cashable credits. In such configurations, these "social" or "non-wagering" versions of casino games do not have to abide by such stringent regulations, and often do not. For example, such games do not have to be truly random, do not have to have a verifiable payback percentage, are not required to maintain the same payback percentage for each play of the game, and are not subject to a minimum or maximum payback percentage. In such non-wagering embodiments, these games can be tailored more to a particular player or player profile, and can be more reflexive in nature in an effort to increase player entertainment. The methods disclosed herein can be applied to such social games, as it is believed that the novel approach to modify a future play of the game, combined with the relative ease of understanding the method, would be equally desirable in such social and non-wagering environments. In such embodiments, it should be understood that instead of modifying a future wager, the methods disclosed herein would modify a future offer to play the game.

Figure 3:
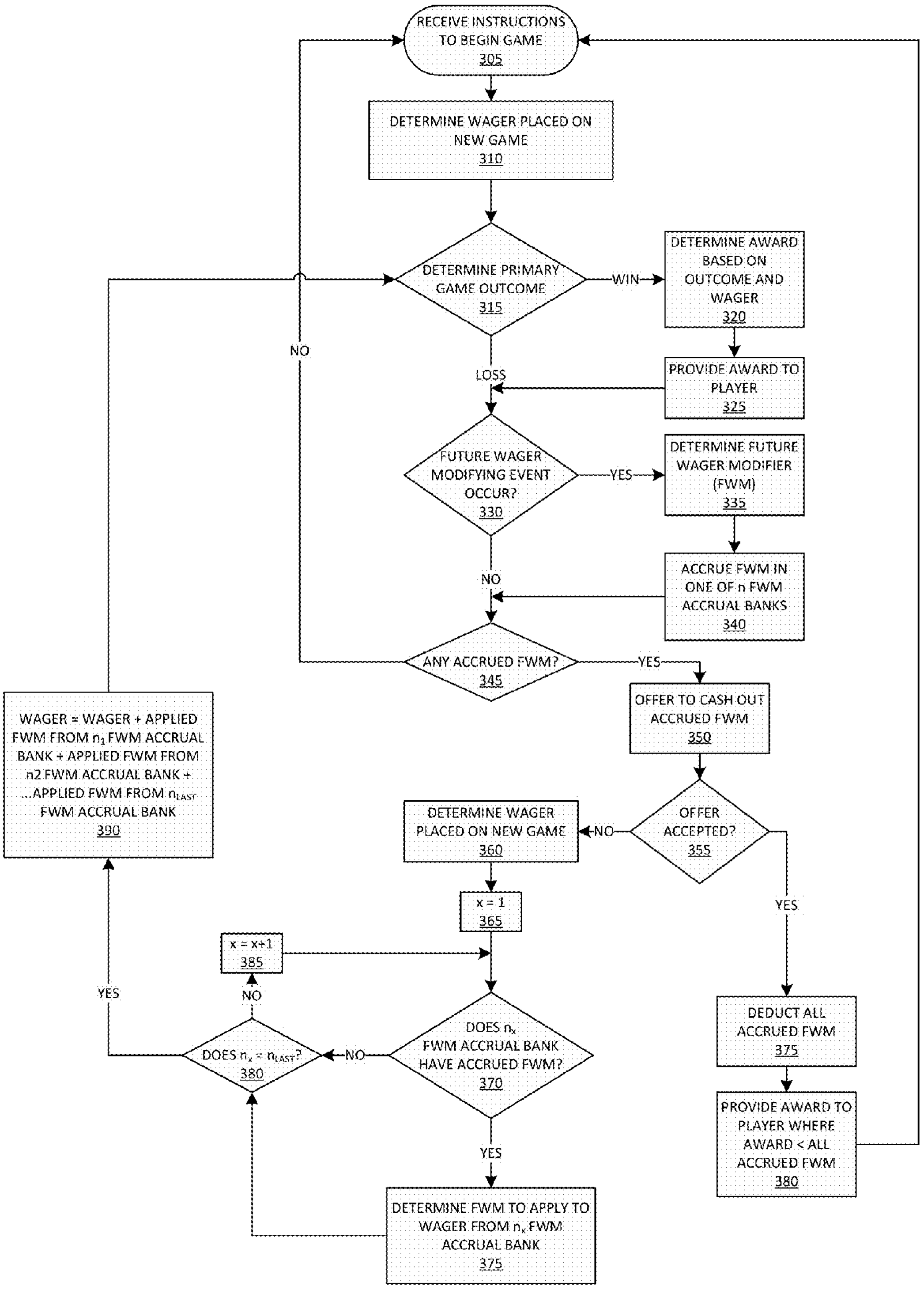
FIG. 3 is a flowchart illustrating how a gaming system, in accordance with an embodiment of the present invention, would be configured.

Referring to FIG. 3, a flowchart of how one embodiment of the present invention may be configured will be discussed. At step 305, the gaming system receives instructions to begin a play of the game. These instructions are, in one embodiment, caused by the player interacting with at least one input device, such as a “spin” button or a “play” button, which is communicated to the gaming system CPU. In the flowchart of FIG. 3, step 310 is illustrated next where the gaming system determines the wager placed on the new play of a game. It should be understood that while step 310 is shown to occur after step 305, it is contemplated that a gaming system could be configured so that step 310 occurs before, or contemporaneously with, step 305, and the order of such steps are not dispositive on defining the present invention. In one embodiment, the wager placed on the play of a new game is greater than or equal to a minimum wager. In another embodiment, the wager placed on a new game is a multiple of the minimum wager. In still another embodiment, the minimum wager is a plurality of credits. It is contemplated that a gaming system which requires a minimum wager of a plurality of credits, and which requires a wager to be a multiple of the minimum wager is particularly conducive to various embodiment of the invention disclosed herein.

At step 315, the gaming system is configured to determine the primary game outcome. In one embodiment, the game is a slot style game, where reels, either virtual or mechanical, are spun and stopped to display a plurality of symbols for a game outcome determination. In another embodiment, the game is a video poker style game. In still another embodiment, the game includes various symbols that are displayed falling onto the screen. It is contemplated that numerous styles of primary games can be utilized within the present invention.

If it is determined at step 315 that the primary game outcome is a win, then the flowchart goes to step 320 where an award is determined based on both the determined outcome from step 315 and the determined wager from step 310. For example, as is common in the gaming system industry, gaming machines provide for the possibility of numerous different types of wins, which are typically arranged in a hierarchal manner with large wins and smaller wins, which each have an associated award value. This award value is then potentially increased based on the underlying wager on the game. This information is often conveyed to a player of the gaming system via a paytable, which is typically displayed in one or more places on a gaming machine or by one of the display devices associated with the gaming machine. In a more specific example, it could be that a specific gaming machine will pay 2 credits per credit per payline wagered for a game outcome of a single Cherry symbol—so if the player wagers 1 credit per payline and a single Cherry is the determined outcome, an award of two credits will be determined at step 320, but if the player had wagered 4 credits per payline, an award of 8 credits would be determined.

At step 325, the determined award from step 320 is caused to be provided to the player. In one embodiment, the award is credited to a credit meter of the gaming system. In another embodiment, the award is provided in the form of currency, such as coins, which are provided by the gaming system. It is contemplated that the award could be provided physically (e.g. through coins or other physical currency, etc.), electronically (e.g. through crediting a credit meter, electronic funds transfer, electronic deposit to a player account, etc.) or in any other manner in which an award can be provided to a player. Historically, such awards are typically provided by crediting the associated credit meter of the gaming system, which then allows the player to take further action to cash out the award and receive a ticket printed by the gaming machine, which can then be exchanged for physical currency. Credits, which are typically indicated on a credit meter, which the player is allowed to utilize in ways other than playing the gaming machine are referred to as cashable credits, as historically players can cash out such credits to use away from the gaming machine that provided the cash out. In a social or non-wagering environment, such cashable credits can be used to play other games, but may not be exchanged for actual currency.

At step 330, the gaming system determines if a future wager modifying event has occurred. In one embodiment, the event occurs if a specific symbol or combination of symbols is displayed by the gaming system. In another embodiment, the event occurs based on a determination that is not displayed by the gaming system. In a further embodiment, the event occurs based on a determination performed remote from the player’s location. In another embodiment, the determination is random, predetermined, sequentially ordered, based at least partially on another player’s actions, based at least partially on a play of a distinct game, or a combination of two or more thereof.

If at step 330 it is determined that a future wager modifier event has occurred, then at step 335, the value of the future wager modifier is determined. In one embodiment, the value is randomly determined. In another embodiment, the value is determined based on the determined wager associated with the associated play of the game. In a further embodiment, the future wager modifier is determined from a range or listing of possible modifiers. In one embodiment, the future wager modifier is determined by randomly selecting one of a plurality of possible modifiers from a range or listing of possible modifiers, wherein the range or listing of possible modifiers is based on the determined wager. In another embodiment, the value is predetermined, is based on a players historic play of similar gaming machines, is based on a player’s loyalty club rating, or a combination of two or more thereof.

Once the value of the future wager modifier is determined at step 335, it is accrued, at step 340, in one of “n” future wager modifier accrual banks. The variable “n” here represents the number of future wager modifier accrual banks, and it is contemplated that this number is two or more. The number of future wager modifier accrual banks can be predetermined, randomly determined, determined by a gaming establishment operator, determined by the gaming system designer, determined by the player, or a combination of two or more thereof. In one embodiment, it is contemplated that the “n” is greater than three but less than nine.

At step 345, the gaming system next determines if there are any accrued future wager modifiers. It is contemplated that such accrued future wager modifiers could have been awarded on the concurrent play of the gaming system, or on an earlier play of the gaming system, and therefore there is a need to determine if any accrued future wager modifiers remain. If it is determined that no such future wager modifiers are accrued, the system returns to step 305 to determine if the player wishes to play again.

If there are accrued future wager modifiers, the gaming system then, in the present embodiment, offers to exchange the future wager modifiers at step 350. In another embodiment, the gaming system does not allow a player to exchange their future wager modifiers. In such an embodiment, any awarded future wager modifiers must be utilized via a play of a future game, either on the same gaming system that awarded them, or on a distinct gaming system. In a freeplay embodiment, the future game modifiers cannot be exchanged for currency, but in some embodiments could be exchanges for other forms of non-cashable credits.

In the present example, the gaming system next determines if the player accepts the offer to exchange any accrued future wager modifiers at step 355. If the player does elect to exchange the accrued future wager modifiers, the gaming system then deducts, in the present embodiment, all accrued future wager modifiers at step 375. It is expressly contemplated that in certain embodiments of the present invention, less than all of the accrued future wager modifiers may be deducted, thereby leaving some future wager modifiers for utilization by the player on a future play of the gaming system. However, it is also contemplated that by requiring all of the accrued future wager modifiers to be exchanged if the player wants to exchange any accrued future wager modifier makes the gaming experience more efficient in that it becomes less confusing to the player, it requires less instruction to the player, and it requires less distinct interfacing with the player, such as by way of not needing dedicated buttons or other player input mechanisms which allow a player to specifically exchange only a portion but not all of their accrued future wager modifier, and it accelerates the speed of play on a particular gaming machine, which is a benefit often sought by operators.

Proceeding after step 375, the gaming system causes an award to be provided at step 380, wherein the award is based on the accrued future wager modifiers being exchanged. In one embodiment, this award is in the form of cashable credits, which will be credited to the credit meter associated with the gaming system. In another embodiment, this award is a physical prize. In still another embodiment, the award is in a form of alternate currency, which has limitations on its use after such exchange. In the present embodiment illustrated by FIG. 3, the cashable credit award provided at step 380 is less than the displayed credit value of the future wager modifier, which is illustrated more clearly in the example below. It is contemplated that there are at least two distinct and significant advantages to providing an exchange that includes fewer cashable credits than future wager modifier credits. The first is that by doing so, you create at least an apparent incentive to the player to utilize their future wager modifiers to continue playing the associated gaming machine rather than cash them out and potentially leave with un-played money. The second contemplated advantage is that by utilizing the mathematics of the underlying primary game, such as the average expected payout of the primary game, combined with offering a player a less-than-optimal play strategy, the value displayed as the future wager modifier can be a higher value than its actual cost to provide the future wager modifier. A simple example to illustrate this is that if the gaming system is configured to, on average, return 80% to players, often referred to as an overall payback percentage, and configured to utilize future wager modifiers to match an actual wager made by a player, then a matching wager of 350 credits actually costs only 280 credits (350×80%). Further, it is believed that offering an exchange value that is equal to the actual value of the matching wager credits, while mathematically viable and acceptable, is less desirable from an operator viewpoint than offering an exchange value less than the actual value of the matching wager. It is expressly contemplated that by offering such a lower exchange value, that the player will recognize the value in playing the matching wager vs. exchanging it, and that those players that do opt to exchange it will be playing sub-optimally, which will result in a further advantage for a gaming operator.

It is generally understood that while some gaming jurisdictions allow overall payback percentages as low as 75%, that the vast majority of payback percentages of actual-placed gaming machines range from about 85% to 96%, and generally the higher payback percentages are associated with higher denomination gaming machines. Utilizing the example above, that would generally mean that a matching wager of 350 credits would have an actual value of between 298 credits (350×85%) and 336 credits (350×96%), with an extreme low end of 263 credits (350×75%). Additionally, while each gaming system's actual payback percentage fluctuates based on each random play, each gaming machine legally sold has an associated, statistically-verified payback percentage which generally accompanies each gaming machine in a document called a PAR sheet. For the present invention, it is contemplated that an exchange rate less than or equal to the gaming machine's payback percentage is acceptable. It is further contemplated that an exchange rate greater than or equal to 33% of the matching wager value is desirable as well, in order to not upset those players that are required for various reasons (e.g. need to leave for a prior-arranged engagement, etc.) to exchange their matching wager credits. It is specifically contemplated that an exchange rate that is less than or equal to the gaming system's payback percentage minus 10% but greater than or equal to 30% of the matching wager value provides significant value over exchange rates outside this range. Again, using the example above, this would equate to an exchange offer of between 245 credits (350×(80%−10%)) and 105 credits (350×30%). It is further contemplated that utilizing an exchange rate of 50% provides significant advantages in that, which it is within the previously identified range, it provides an offer that can be more easily understood by a player—the player will in most instances be more easily able to understand how their offer was determined on each play, as the offer is equal to half of their displayed matching credits. As it is a stated goal to offer a game which can be easily understood by a player, an exchange rate of 50% is believed to offer a significant advantage in this regards.

If the exchange offer is not accepted at step 355, the gaming system then determines the wager placed on a new game at step 360. From this step, the process of FIG. 3 loops a number of times based on the number of future wager modifier accrual banks, which again, are represented as "n" in this example. At step 365, "x" which is used to count and/or track the "n" future wager modifier accrual banks is initialized to 1. At step 370, the gaming system determines if the "$n_x$" future wager modifier bank, or in the first instance, if the first future wager modifier bank has any accrued future wager modifiers. If it does, at step 375, the gaming system determines how much of the accrued future wager modifier to apply to the wager. In one embodiment, the applied future wager modifier is less than or equal to the wager placed by the player. In another embodiment, the applied future wager modifier is a multiple of the minimum wager discussed above. In a further embodiment, the applied future wager modifier is based on the accrued future wager modifiers in that accrual bank, the accrued future wager modifiers of one or more accrual banks, the player's wager at step 360, a random determination, a predetermined determination, or a combination of two or more thereof. It is specifically contemplated that requiring the applied future wager modifier to be a multiple of the minimum wager creates a readily understood gaming dynamic that will be easy and expedient to educate players about. It is further specifically contemplated that by combining this functionality with the additional requirement to attempt to match the player's wager, if there exists enough accrued future wager modifiers in the accrual bank, creates both an entertaining and easily understood gaming dynamic.

After the gaming system determines the future wager modifier to apply to the player's wager, or if that particular accrual bank does not have any accrued future wager modifiers, the gaming system then determines if that particular accrual bank is the last accrual bank, shown at step 380 as testing to see if $n_x$ equals $n_{LAST}$ which represents the last accrual bank to be tested. If it is not the last accrual bank, the system then re-initializes "x" to equal "x+1" at step 385 and loops back through the appropriate steps to determine any further future wager modifiers to apply.

Once the system has determined all future wager modifiers to apply to the player's wager, the gaming system then applies the determined future wager modifiers to the wager at step 390. In the current example, this is illustrated by simple addition, and adding the represented value of each future wager modifier determined to be applied from each accrual bank to the player's wager. This combined wager is then treated as the wager, and the system then determines the primary game outcome at step 315. It is contemplated that instead of adding the determined future wager modifiers to the player's wager, other methodologies could be utilized. Specifically, in one embodiment, it is contemplated that the future wager modifiers could be displayed as multiplying the player's wager. In this embodiment, it may be desirable to ensure that the future wager modifier that is determined to be applied is at least equal to the player's wager, again, in order to simplify the understanding of the feature to a player. In the embodiment illustrated in FIG. 3, it is contemplated that by utilizing addition, it allows a game designer to allow future wager modifiers less than the player's wager to be utilized while still being easily understood by a player of the gaming system.

Figure 4A:
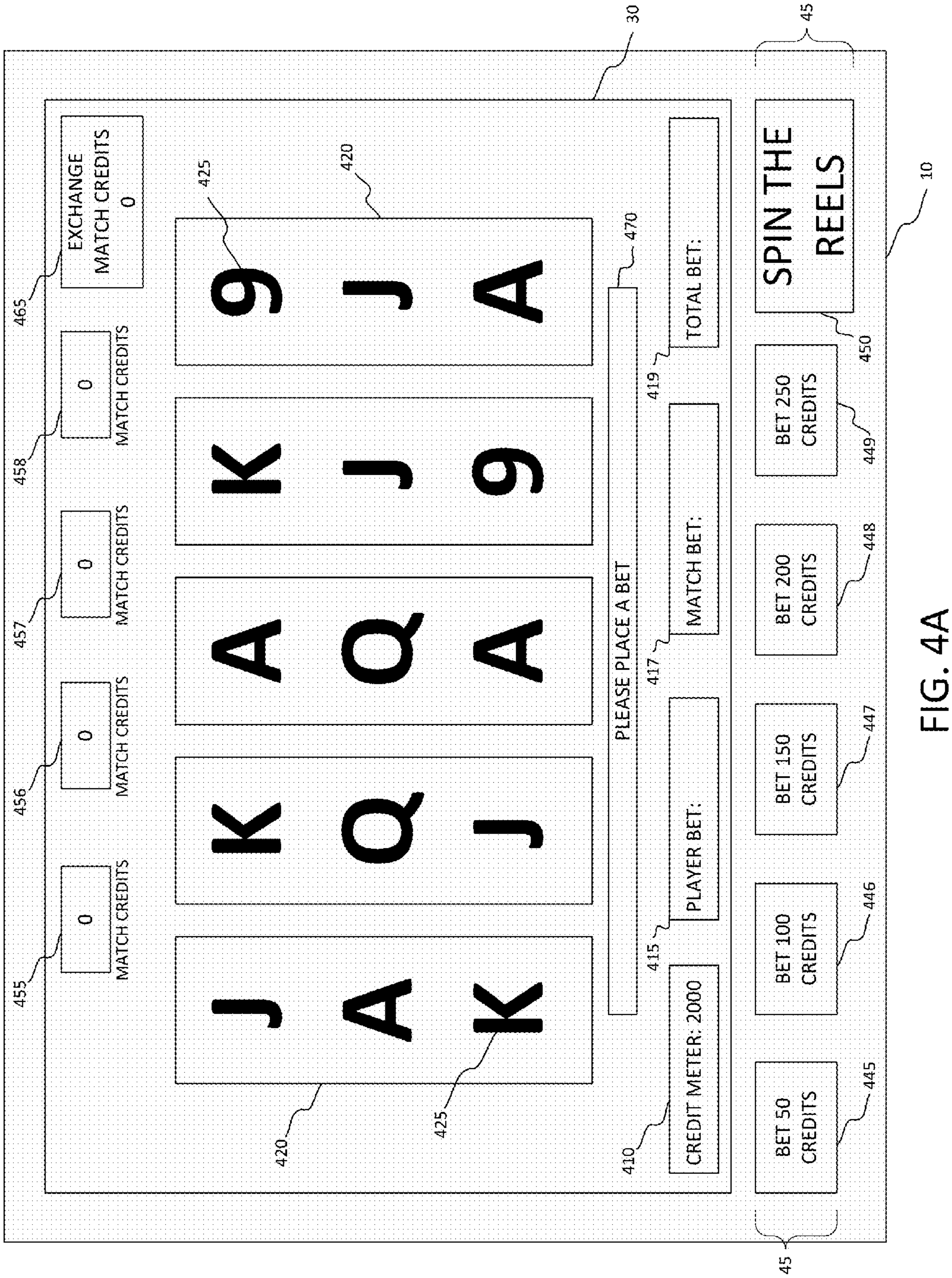
FIGS. 4A, 4B, 4C, 4D, 4E, 4F, 4G, 4H, 4I, 4J, 4K, 4L, and 4M are front plan views of one embodiment disclosed herein of a gaming device indicating the generation of symbols, awarding of a future wager modifying event, accrual of the awarded future modifier, utilization of an accrued future wager modifier to modify a player's bet, and exchanging an accrued future wager modifier for cashable credits.

FIGS. 4A through 4M illustrate an example of how a gaming system, configured in accordance with FIG. 3, might operate. At FIG. 4A, gaming system 10 has buttons 45, and specifically bet buttons which are associated with betting, or wagering, various levels of credits 445-449, and a spin button 450 which initiates a play of a new game. The gaming system also has a primary display 30 which, in this example, displays five reels 420 which display various game symbols 425. The primary display 30 also displays a credit meter 410, which displays the number of cashable credits associated with the player and/or gaming system. The primary display 30 also includes a player bet meter 415, which displays the bet or wager currently being registered by the gaming system, a bet modifier meter 417, which informs the player of any applied future wager modifiers, and a total bet meter 419 which illustrates the total wager that will be applied to the game outcome. Primary display 30, in this example, also includes a messaging box 470, which at FIG. 4A reads "PLEASE PLACE A BET." In the example of FIG. 4A, four separate future wager modifier accrual banks 455-458 are displayed by the primary display 30, in addition to a future wager modifier exchange interface 465. In this example, the future wager modifier exchange interface utilizes the touchscreen features of primary display 30 to act similar to the buttons 45 in receiving input from a player of the gaming system. As can be seen in FIG. 4A, the gaming system, and therefore the player of the gaming system, does not have any accrued future wager modifiers as all of the future wager modifier accrual banks 455-458 display a "0" in their meter. It should be understood that in the present embodiment, the accrued future wager modifiers are associated with the gaming system, and not the identity of any player of the gaming system, and so the displayed accrued future wager modifiers and their application are regardless as to the identity of the player. It is contemplated that while this example utilizes numbers to relay the value of the match bet to the player, it is possible to use non-numerical indicators as to the value of accrued future wager modifiers, such as a graphical representation showing a relative value of accrued match wagers. One example of such a graphical representation could be a thermostat or a piggy bank, which could display a relative level. It is also contemplated that in certain embodiments, the value of accrued future wager modifiers is not displayed or otherwise relayed to the player. Continuing with FIG. 4A, the messaging shown with each of the future wager modifier accrual banks 455-458 is "MATCH CREDITS" and the messaging shown with bet modifier meter 417 is "MATCH BET" because in this embodiment, each future wager modifier accrual bank will attempt to match the player's wager. However, it is contemplated that alternative messaging can be included with such features based on the desired effect by the game designer.

Figure 4B:
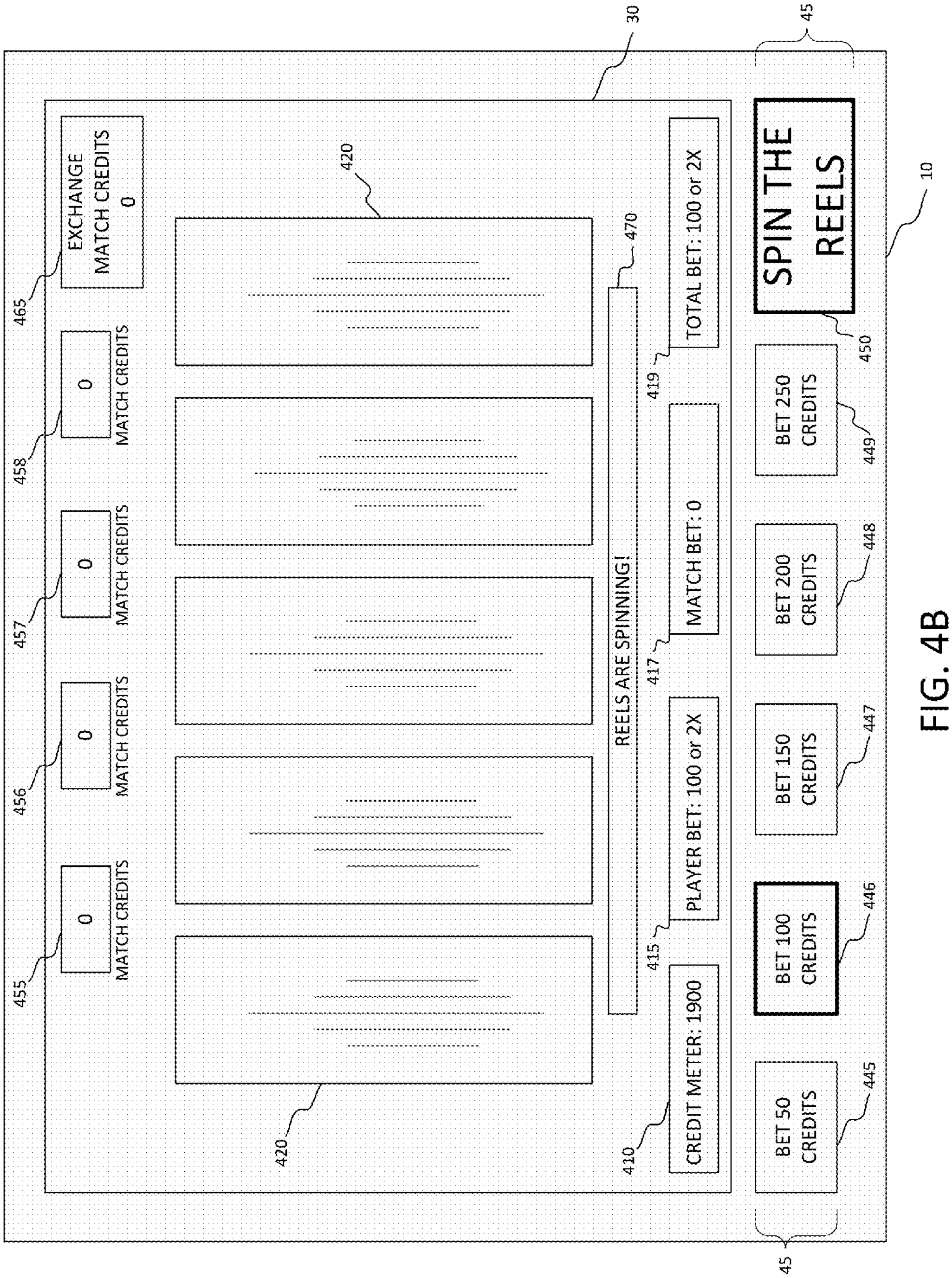

Referring to FIG. 4B and continuing with this example, the player has selected the "BET 100 CREDITS" button 446 and selected the "SPIN THE REELS" button 450, which has initiated a new game, represented by the reels 420 spinning. As a result of this action, the credit meter 410 has decremented from 2000 credits to 1900 credits, and the player bet meter 415 indicates that the player has wagered 100 credits, or 2× of the minimum bet (50 credits in this example) on this play of the game. As there were no accrued future wager modifiers, the bet modifier meter 417 indicates that there is no match bet, so the total bet meter 419 indicates a total bet of 100 credits or 2× as well. The messaging box 470 indicates the current status of the game, which is that the "REELS ARE SPINNING!"

Figure 4C:
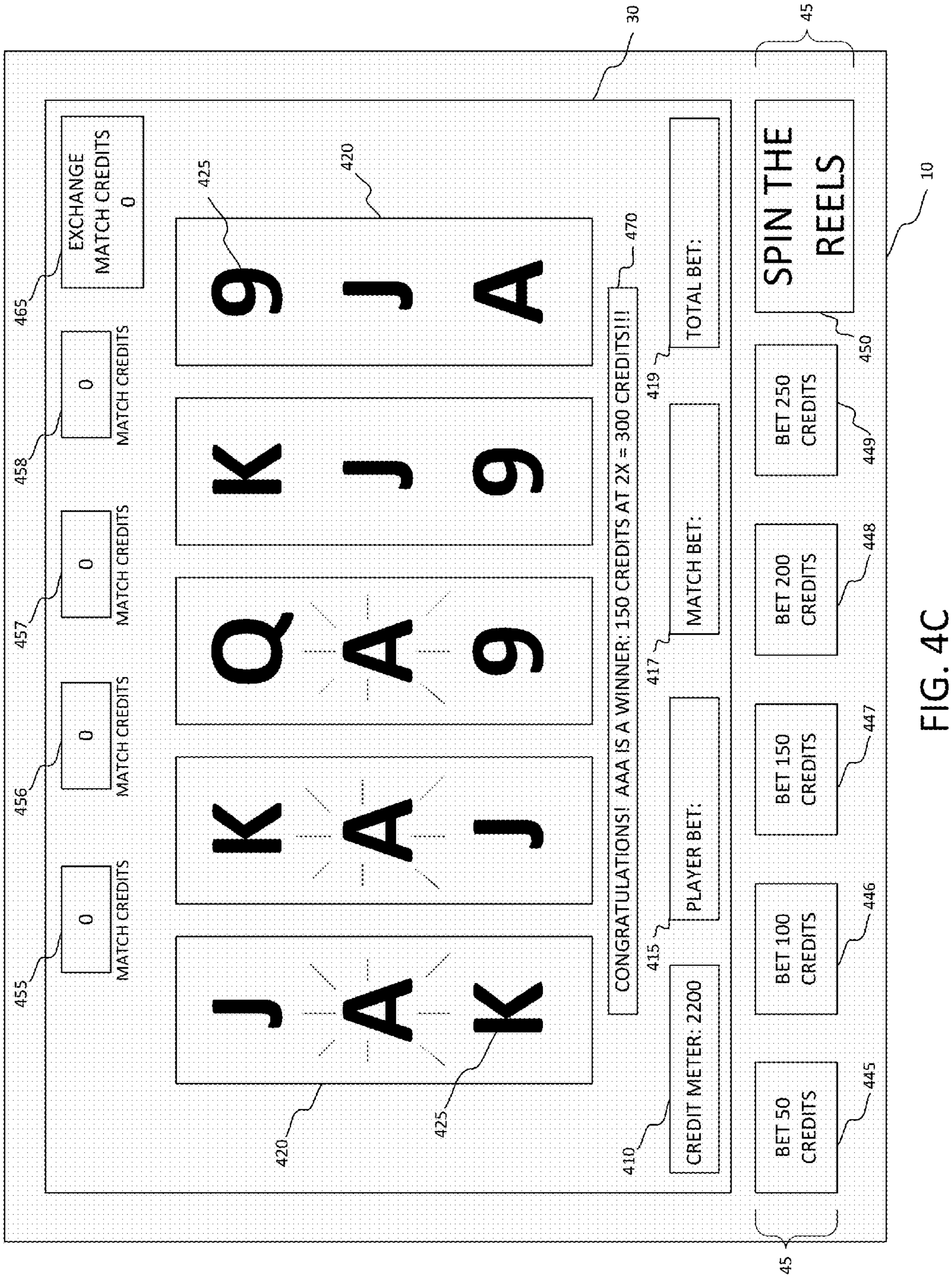

At FIG. 4C, the reels 420 have stopped and indicated a winning combination of "AAA" as confirmed by the messaging box 470. The messaging box 470 also illustrates the award the player has earned, and specifically that "AAA" provides an award of 150 credits, and because the player had wagered at a 2× level, the total award provided to the player is 300 credits. This win is also reflected at the credit meter 410, which has been incremented the awarded 300 credits. As is evident in this example, the determined award of 300 credits is based on both the game outcome of "AAA" (which provides a base award of 150 credits) and the player's wager (which was two times the minimum wager amount of 50 credits).

Figure 4D:
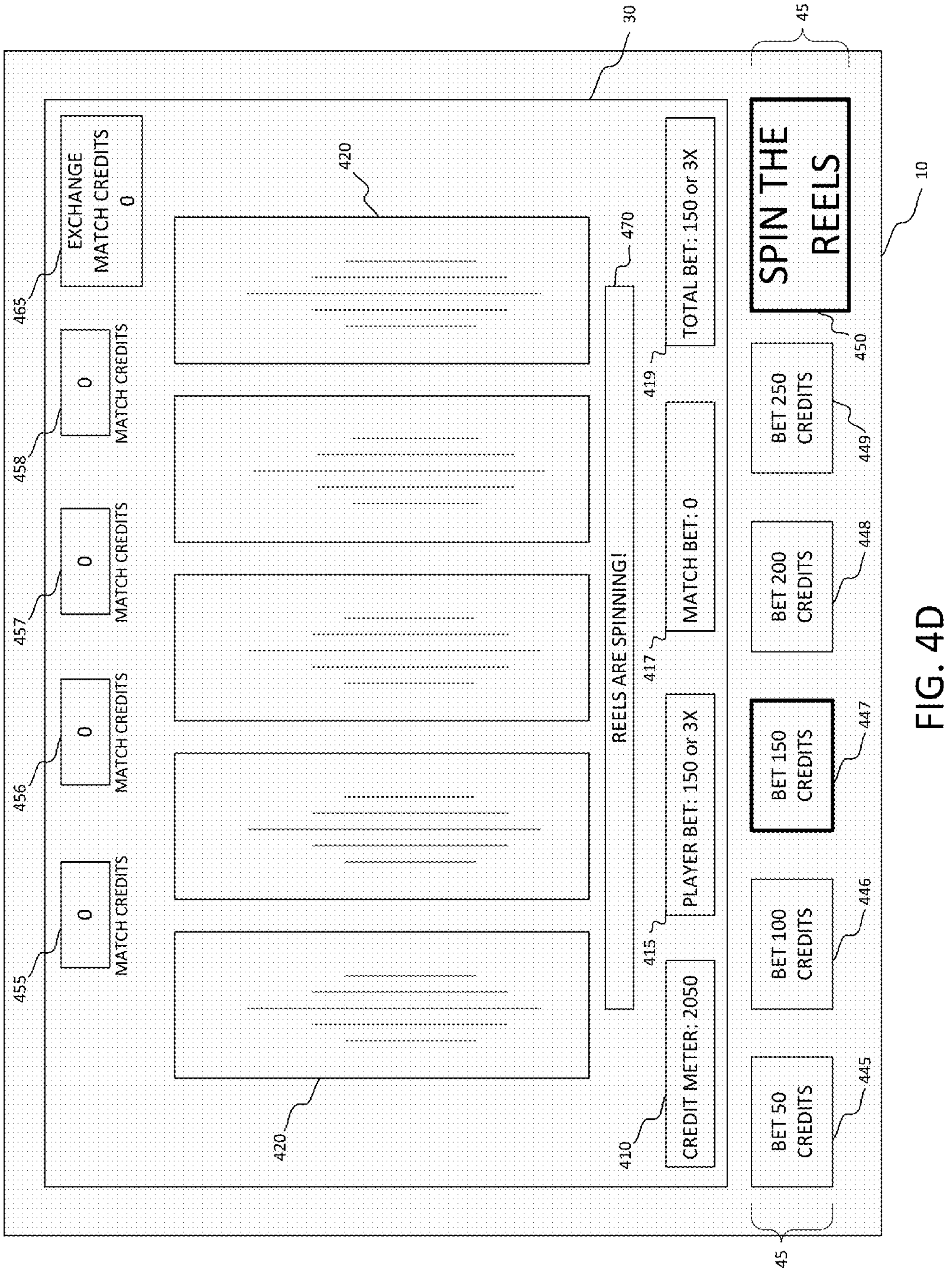

In FIG. 4D, the player has selected the "BET 150 CREDITS" button 447 and the "SPIN THE REELS" button 450 which caused a new game to be initiated. This, in turn, has caused the reels 420 to spin, and the credit meter 410 to decrement from 2200 credits to 2050 credits, which reflects the player's bet of 150 credits. Player bet meter 415 further displays this information by indicating that the player has wagered 150 credits or 3× the minimum bet of 50 credits. Again, as the gaming system does not have any accrued future wager modifiers, the bet modifier meter 417 indicates that no modifier is being applied to the current wager, and the total bet meter 419 reflects this as well by indicating that the total bet being applied to the current game is 150 credits or 3× the minimum bet.

Figure 4E:
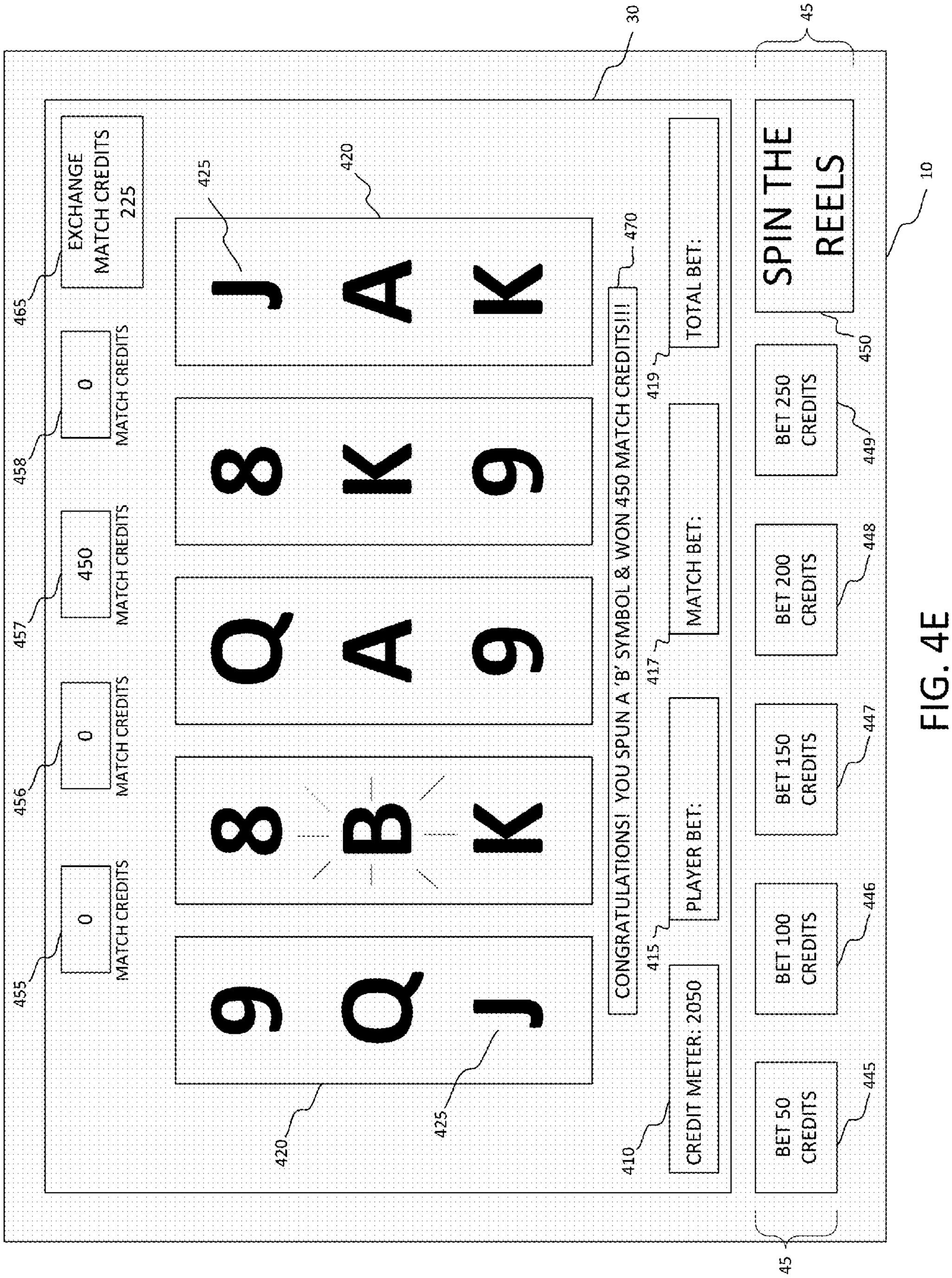

At FIG. 4E, the reels 420 of the gaming system 10 have stopped, which causes the plurality of reel symbols 425 to indicate the outcome of the current play of the game. In this play, the outcome of the play includes a bonus "B" symbol which awards a future wager modifier. This is explained to the player at the messaging box 470 which informs the player that they have been awarded "450 MATCH CREDITS" which in this embodiment, as detailed more below, acts like a match bet to the player's bet. In the present example, for each bonus B symbol that is part of a game outcome, the machine randomly selects a match credit value which is between 1× and 5× of the player's bet, and in FIG. 4E, the value of 450 match credits reflects a 3× of the players bet of 150 credits. This future wager modifier award is reflected in future wager modifier accrual bank 457, which now indicates 450 match credits. In the present example, the gaming system 10 randomly selects one of the future wager modifier accrual banks 455-458 to accrue awarded match bets, but it is contemplated that the system could be configured to select an accrual bank based on a predetermined order, based on the location of the displayed bonus symbol relative other symbols 425, based on historical play on the gaming system, based on historical play be the player, or any combination of two or more thereof. In another embodiment, the 450 match credits could be displayed as a 9× the minimum bet in addition to, or in place of, the 450 match credits. The future wager modifier exchange interface 465 has also been caused to change to now reflect an offer of 225 credits to the player if they wish to exchange the banked 450 match credits. In this present example, the gaming system 10 is configured to apply a 50% discount to any exchange of future wager modifiers. While in the present example no award of cashable credits has been awarded in conjunction with the match credits, it is contemplated that in certain embodiments it may be desirable to also include an award of cashable credits with the award of match credits.

Figure 4F:
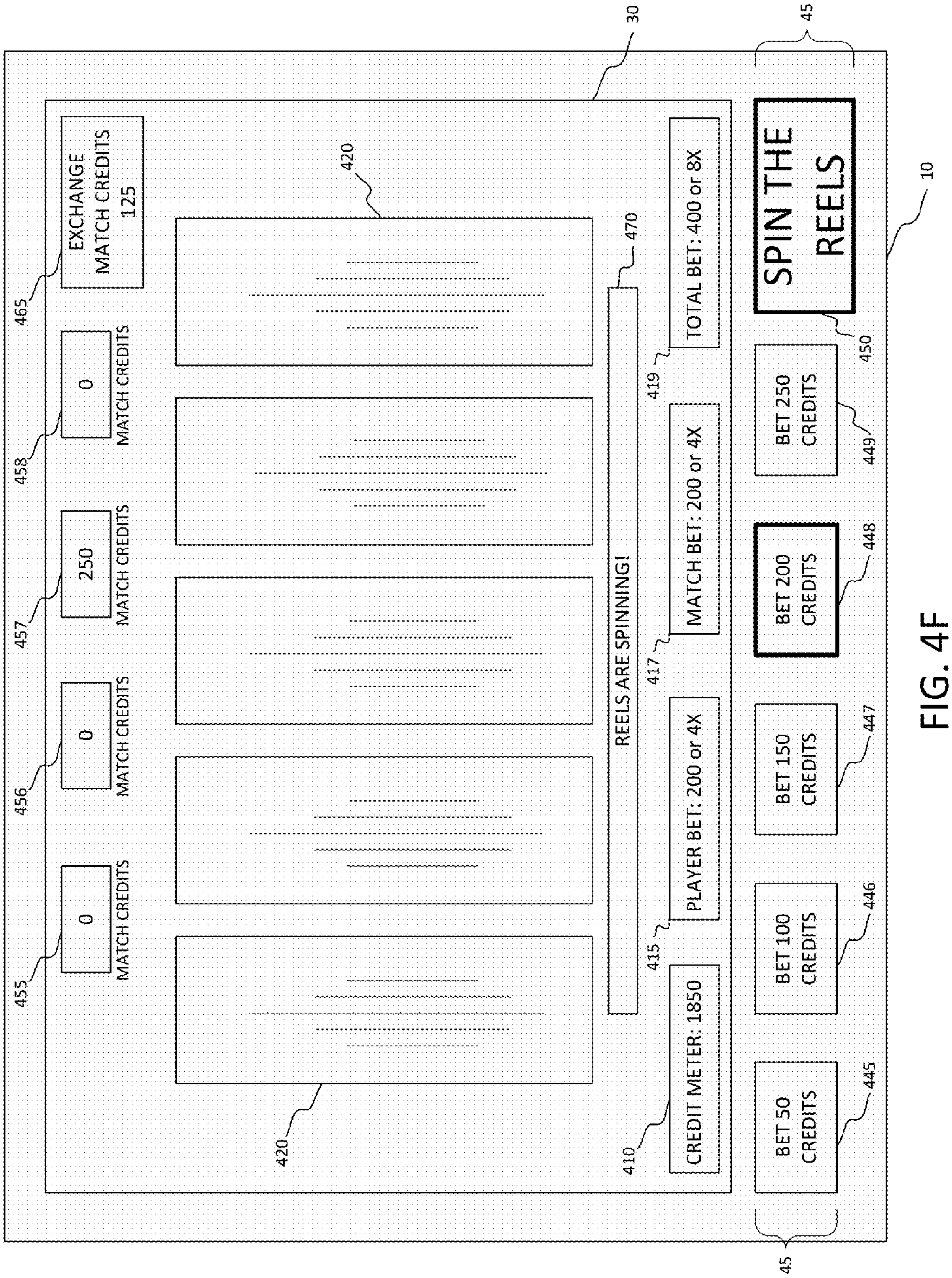

FIG. 4F illustrates where the player has selected the "BET 200 CREDITS" button 448 as well as the "SPIN THE REELS" button 450, which initiated a new play of the game, as indicated by the reels 420 spinning. Credit meter 410 displays the credits being decremented from 2050 credits to 1850 credits, which reflects the information displayed in the player bet meter 415 that the player has wagered 200 credits or 4× the minimum wager. In this play of the game, as the gaming system had accrued future wager modifiers as indicated by the accrual bank 457, the bet modifier meter 417 indicates that a match bet of 200 credits or 4× is being applied to the current play of the game. The total bet meter 419 further illustrates this by indicating that a total bet of 400 credits, or 8× the minimum wager is being applied to the current play of gaming system 10. The future wager modifier accrual bank 457 has been decremented from 450 to 250 to reflect the utilization of the match credits with the current play of the game, and the future wager modifier exchange interface also displays a lower exchange value of 125 to reflect the deducted match credits. As discussed above, in the present example, the gaming system 10 attempts to match the player's wager, and in the instance of FIG. 4F, it was able to, so it applied 200 match credits to the player's wager of 200 cashable credits to provide a total wager of 400 credits, or 8× the minimum wager.

Figure 4G:
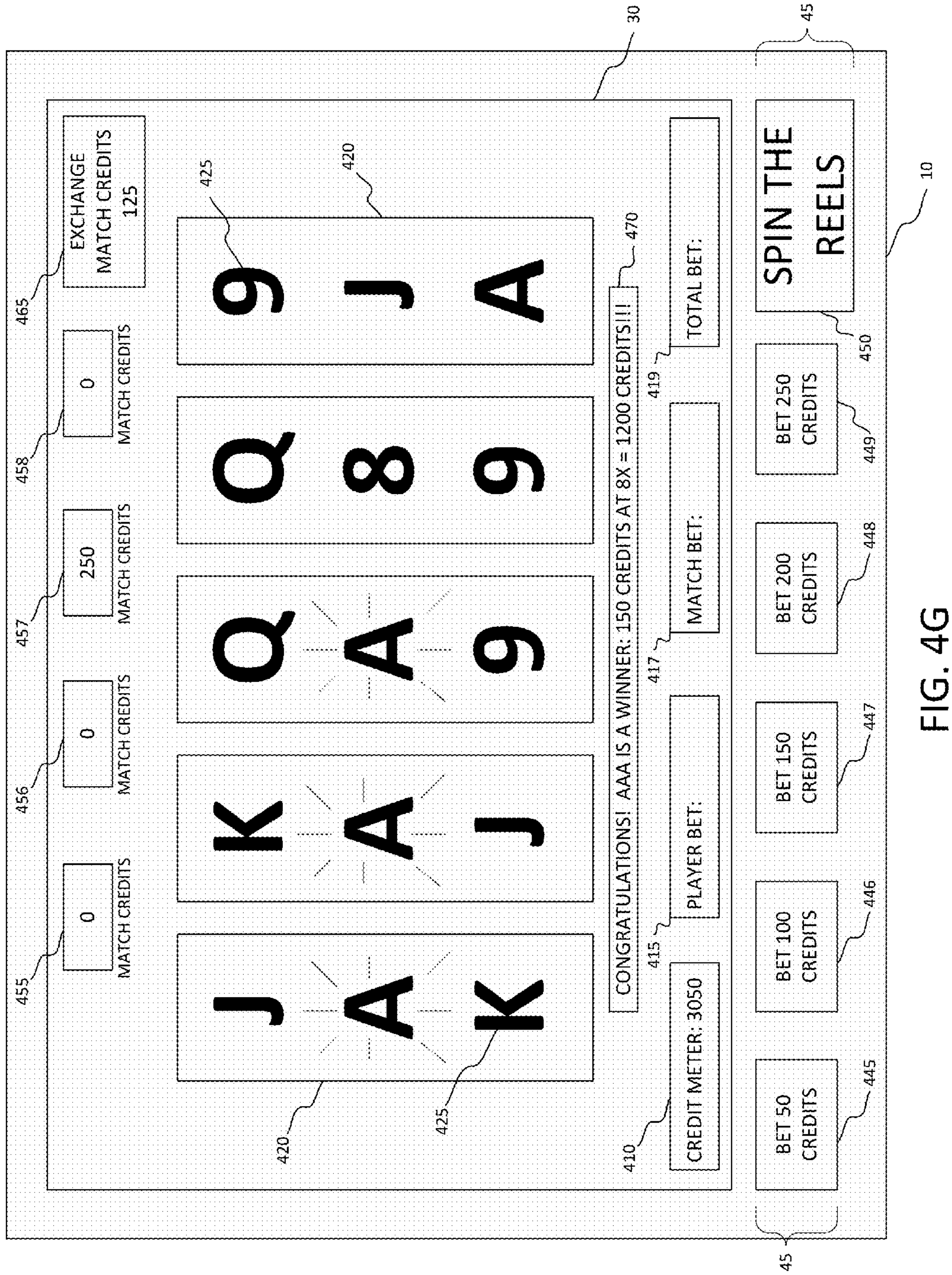

In FIG. 4G, the reels 420 have stopped to indicate the game outcome, and again the gaming system 10 has determined a winning outcome of "AAA" which provides, as previously indicated in FIG. 4C, a base award of 150 credits. Here though, as the applied total bet was 8× due in part to the match wager of 4×, the player is awarded 1200 cashable credits, as clarified by messaging box 470. This award is reflected in the credit meter 410 which has been incremented the 1200 credits to now display a total of 3050 credits. It is contemplated in this example that now the entire 3050 credits can be cashed out by the player and exchanged for currency, such as U.S. dollars.

Figure 4H:
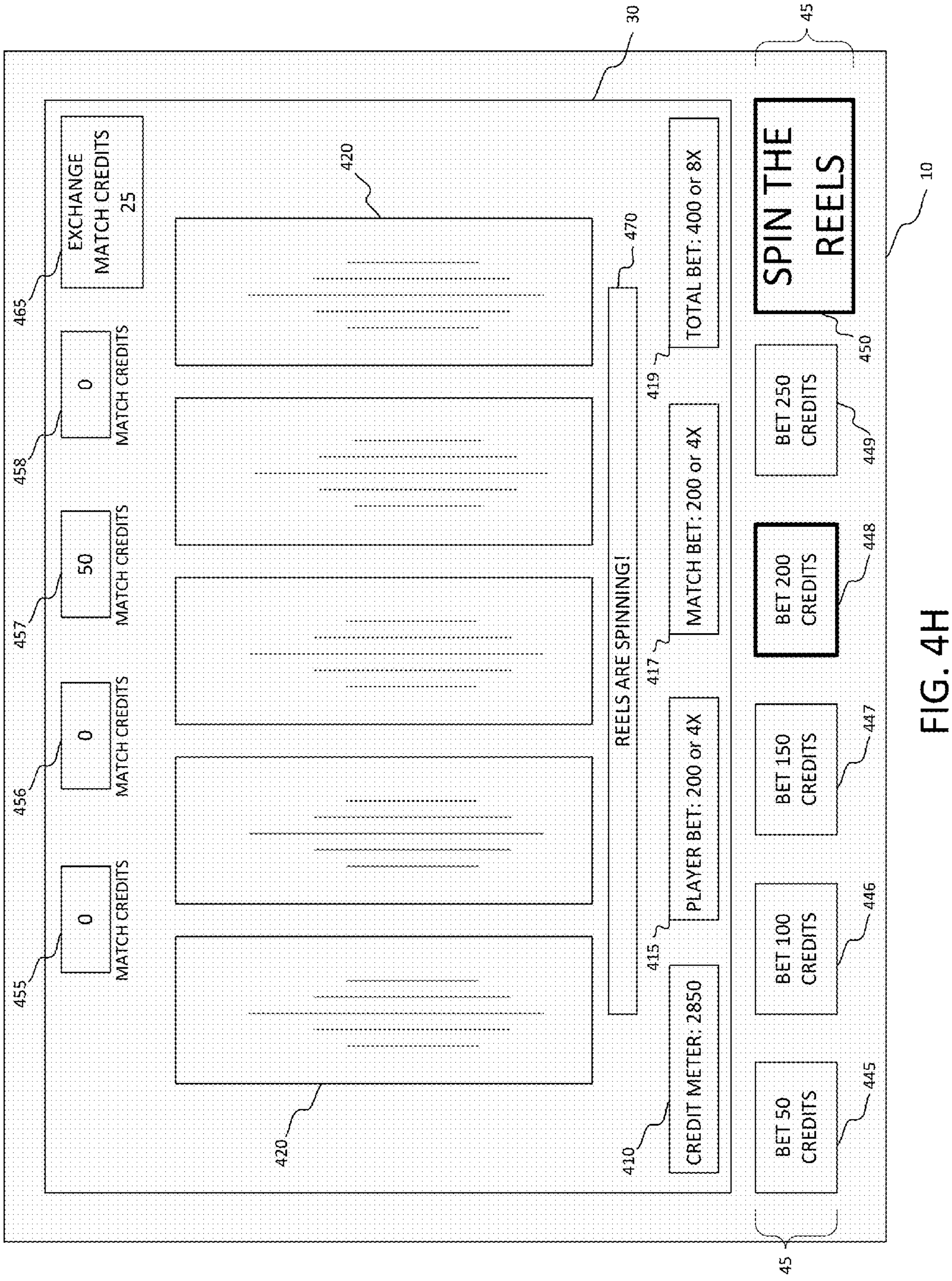

FIG. 4H illustrates where the player has again selected the "BET 200 CREDITS" button 448 as well as the "SPIN THE REELS" button 450, which initiated a new play of the game, as indicated by the reels 420 spinning. Credit meter 410 displays the credits being decremented from 3050 credits to 2850 credits, which reflects the information displayed in the player bet meter 415 that the player has wagered 200 credits or 4× the minimum wager. In this play of the game, as the gaming system still has accrued future wager modifiers as indicated by the accrual bank 457, the bet modifier meter 417 indicates that a match bet of 200 credits or 4× is being applied to the current play of the game. The total bet meter 419 further illustrates this by indicating that a total bet of 400 credits, or 8× the minimum wager is being applied to the current play of gaming system 10. The future wager modifier accrual bank 457 has been decremented from 250 to 50 to reflect the utilization of the match credits with the current play of the game, and the future wager modifier exchange interface also displays a lower exchange value of 25 to reflect the deducted match credits. As discussed above, in the present example, the gaming system 10 attempts to match the player's wager, and in the instance of FIG. 4H, it was again able to, so it applied 200 match credits to the player's wager of 200 cashable credits to provide a total wager of 400 credits, or 8× the minimum wager.

Figure 4I:
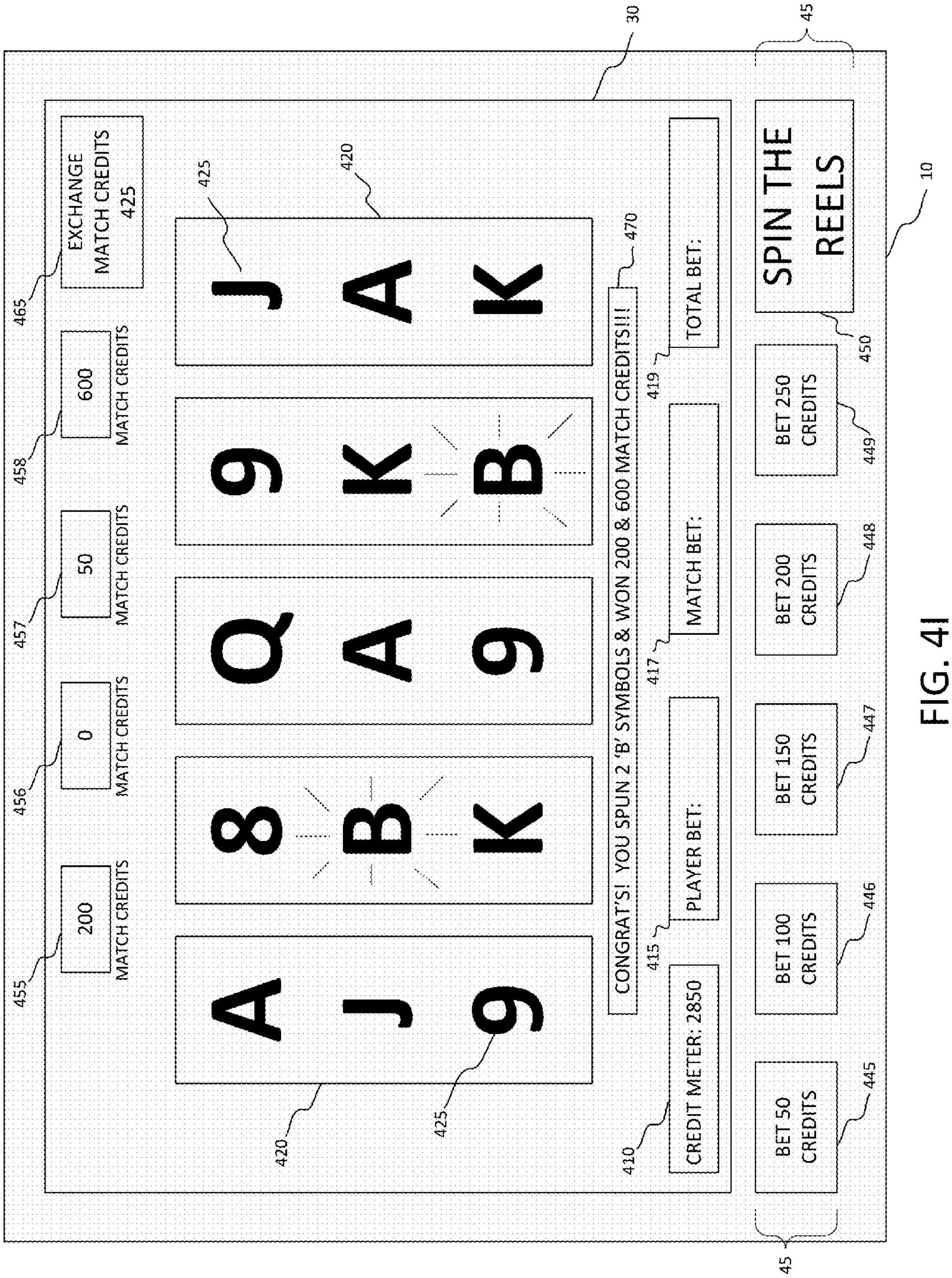
Figure 4J:
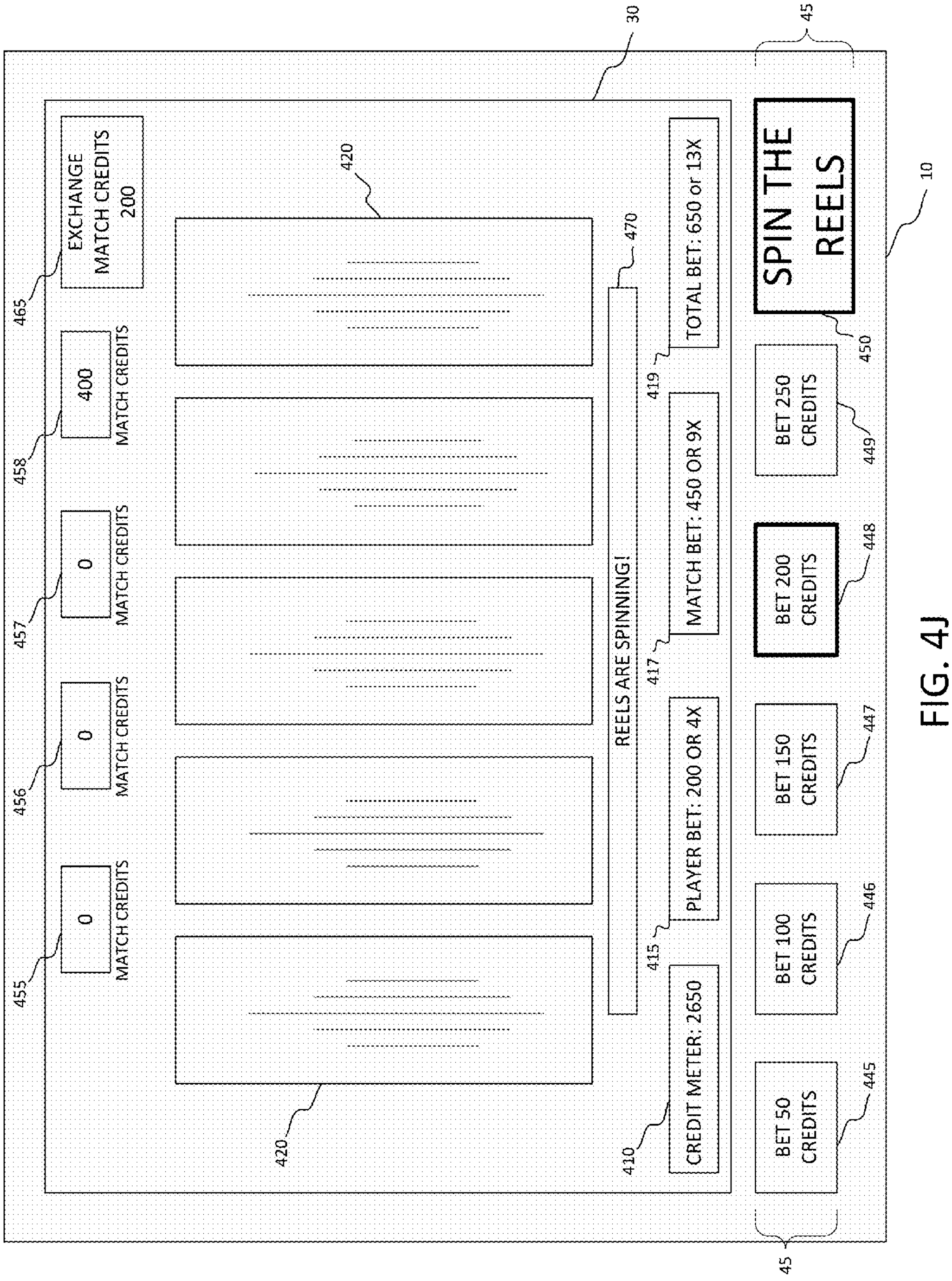

FIG. 4I illustrates where the reels 420 have stopped to display an outcome of two separate bonus "B" symbols. As indicated by the messaging box 470, the first "B" symbol awards 200 match credits, which are incremented into a future wager modifier accrual bank 455, and the second "B" symbol awards 600 match credits, which are incremented into a different future wager modifier accrual bank 458. It is contemplated that when multiple future wager modifiers are awarded in a single play, that both can be accrued into a single accrual bank. However, it is also specifically contemplated that in the present embodiment, wherein the system is configured to try and match the player's wager from each of the accrual banks 455-458, that allocating the separate awards into separate accrual banks provides a more volatile game play dynamic by having a future wager matched by more accrual banks (as illustrated in FIG. 4J) which in turn creates excitement. It also, in the current example, helps in expending the match credits faster over fewer plays of the game, which may be desirable in certain embodiments. In FIG. 4I, the future wager modifier exchange interface has also been changed to reflect 50% of the new cumulative total of all match credits.

At FIG. 4J, the player has again selected the "BET 200 CREDITS" button 448 and the "SPIN THE REELS" button 450 to cause the reels 420 to spin. The credit meter 410 has been decremented from 2850 to 2650 to reflect the player's wager of 200 credits, as confirmed by the player bet meter 415. In this example, one future wager modifier accrual bank 455 has been decremented from 200 to 0 as all 200 match credits were used to match the player wager of 200 credits. Another future wager modifier accrual bank 457 has been decremented from 50 to 0 as the remaining 50 match credits were used to try and match the player wager of 200 credits. And a third future wager modifier accrual bank was decremented from 600 to 400 match credits as 200 match credits were used to match the player wager of 200 credits. In total, as indicated by the bet modifier meter 417, 450 match credits (200+50+200) or 9× the minimum bet are applied to the current game. This in turn provides, as indicated by the total bet meter 419, a total of 650 credits or 13× the minimum bet to be applied to the present game. Continuing with FIG. 4J, the future wager modifier exchange interface has updated the total to 200 credits, which again equals 50% of the cumulative accrued match credits.

Figure 4K:
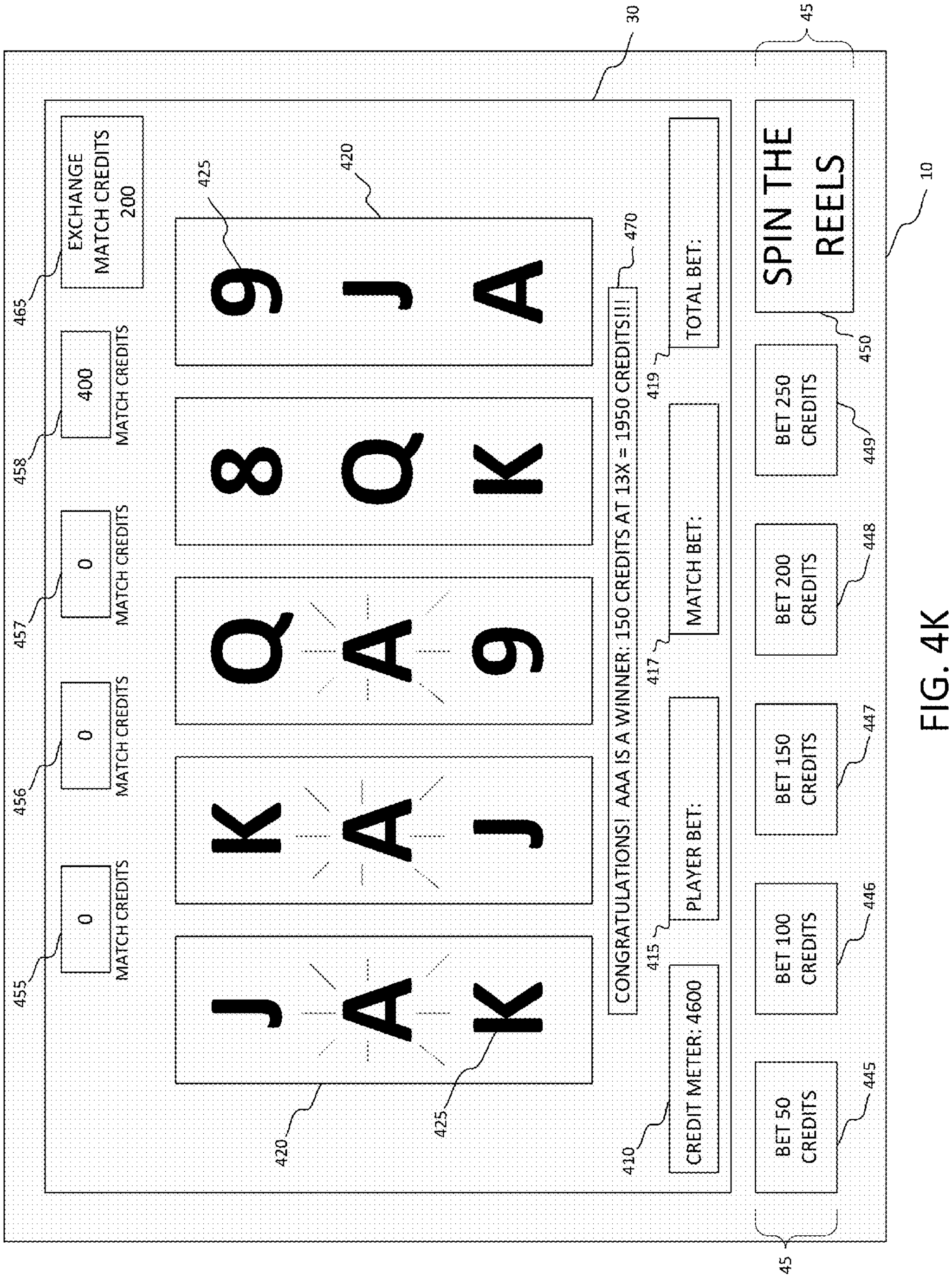

In FIG. 4K, the reels 420 have stopped to indicate the game outcome, and again the gaming system 10 has determined a winning outcome of "AAA" which provides, as previously indicated in FIG. 4C, a base award of 150 credits. Here though, as the applied total bet was 13× due in part to the match wager of 9×, the player is awarded 1950 cashable credits, as clarified by messaging box 470. This award is reflected in the credit meter 410 which has been incremented the 1950 credits to now display a total of 4600 credits.

Figure 4L:
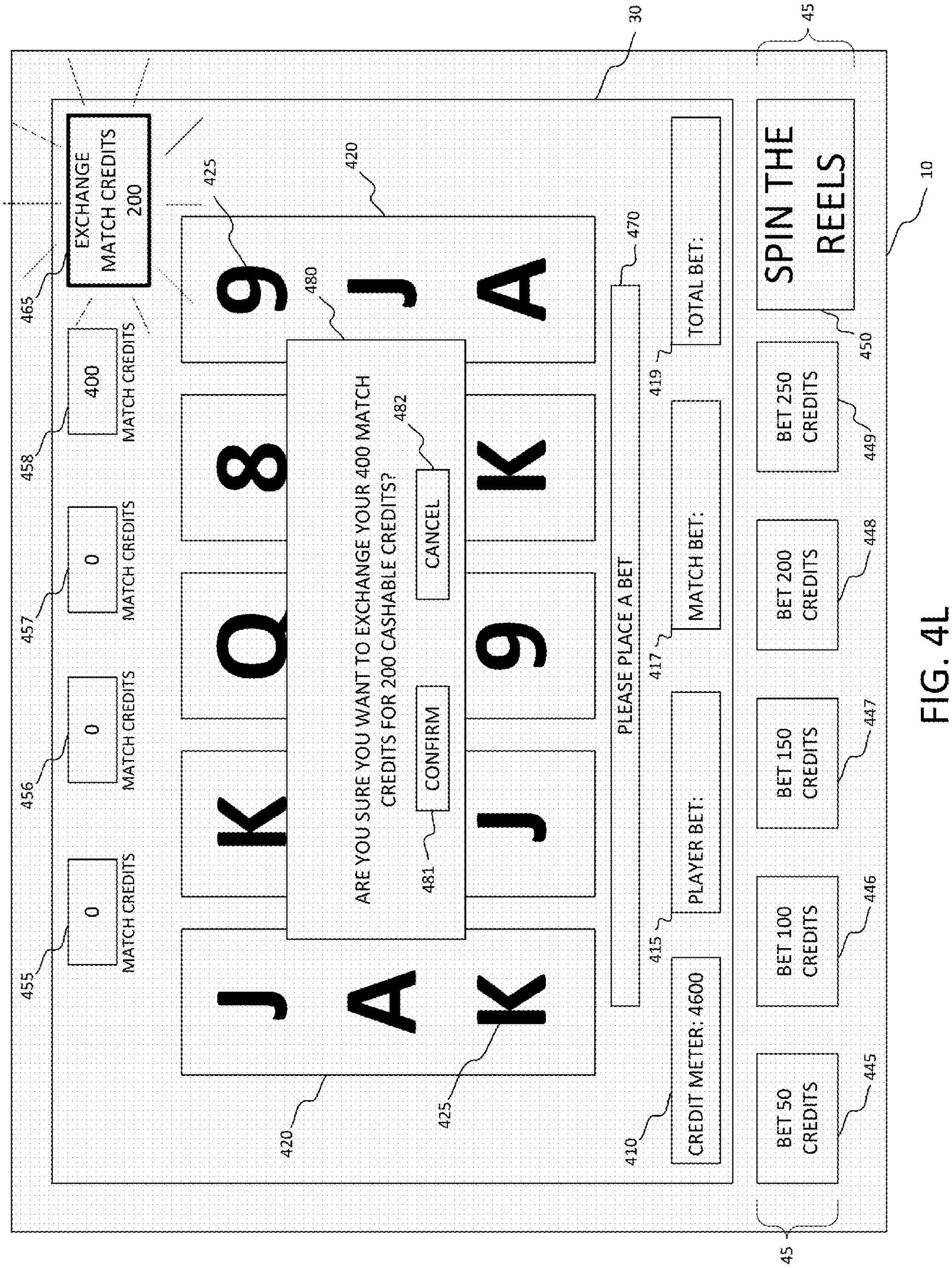

At FIG. 4L, the player has selected the future wager modifier exchange 465 which, in the present example, causes a confirmation box 480 to be displayed on the primary display 30. The confirmation box 480 includes a message to confirm the actions requested by the player, in this case that they wish to exchange the accrued 400 match credits for 200 cashable credits, and includes a confirm button 481 and a cancel button 482.

Figure 4M:
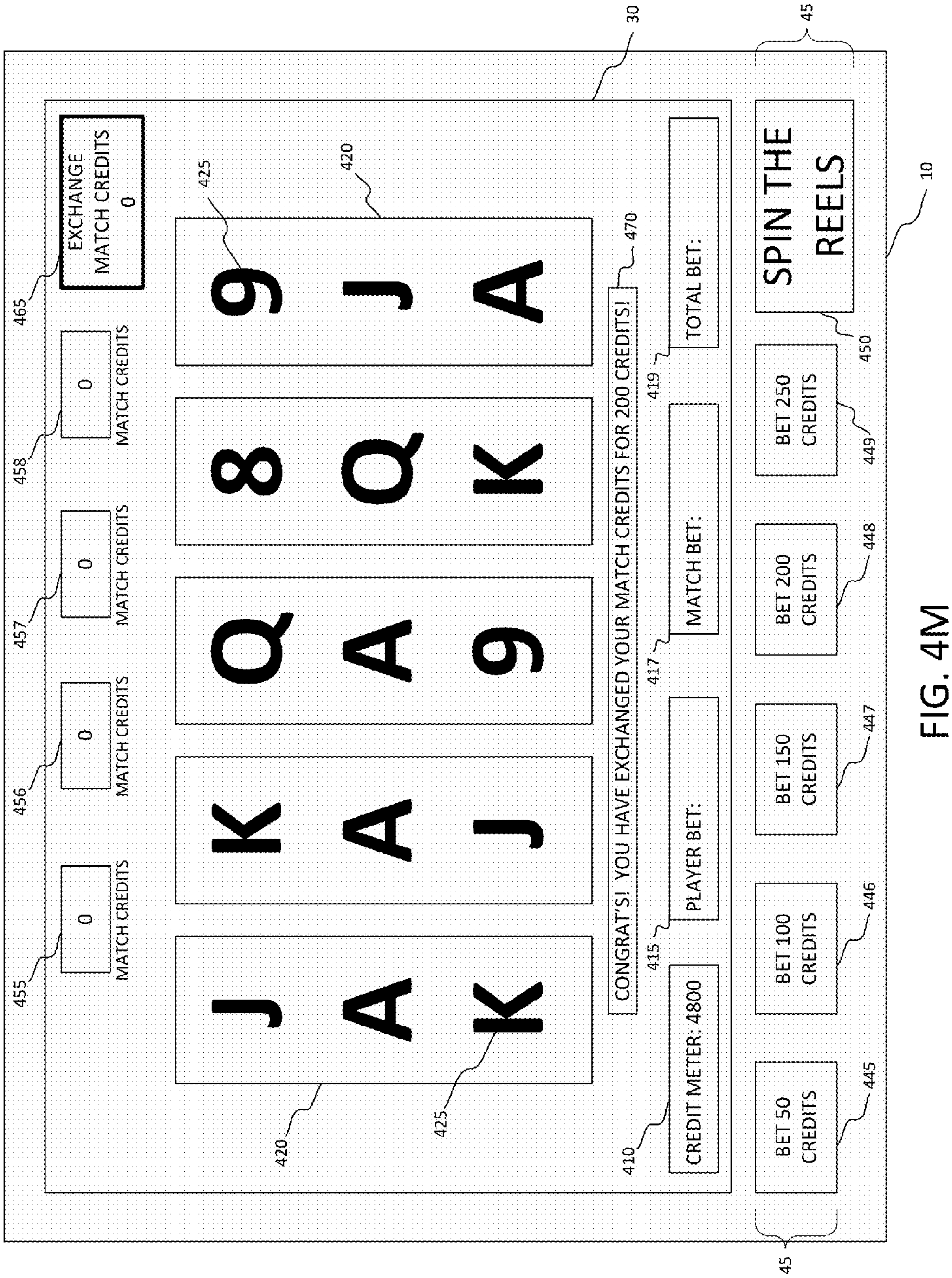

Continuing to FIG. 4M, the player has confirmed the request to exchange the accrued match credits, as confirmed by the message box 470, and the credit meter 410 has been incremented from 4600 credits to 4800 credits. Again, in the present embodiment, the player is then free to cash out all 4800 credits and utilize in other manners, such as exchanging the credits for currency.

It is contemplated that while the embodiments discussed in regards to FIGS. 3 and 4A-4M relate to gaming systems which accept wagers, the methodologies and programming associated therewith can be readily adapted to be utilized for social and/or non-wagering gaming. It is believed by the inventor that while the statistical verifiability of the present disclosure is not a requirement for such social or non-wager games, it nevertheless provides an attractive basis for developing such social or non-wagering games. Combined with the ease of understanding the associated gaming mechanics of the present disclosure, it is believed that the present invention would be successful in such markets, and is therefore expressly contemplated.

In one embodiment, the gaming system of FIGS. 4A-4M also include an additional, separate bonus game. In another embodiment, the separate bonus game is a freespin game. In one particular embodiment, the freespin game provides awards based on the wager associated with the play of the primary game where the freespins were determined to be provided. In an example of such an embodiment, if the player had triggered the freespins by a play of the primary game that had a future wager modifier applied to it, the awards determined by the freespins would be increased based on the applied future wager modifiers as well.

In another embodiment, instead of applying the future wager modifiers in a play of the primary game, they are applied in one or more plays of a bonus game. In this embodiment, the future wager modifier can be accrued based on the play of the primary game, but their application to only plays of the bonus game creates excitement and anticipation for the next bonus game trigger. In one possible implementation of this embodiment, the bonus game is a freespin game, which historically utilizes the player's last wager for each freespin game to determine the award, but in the present embodiment would also utilize a future wager modifier to modify the wager utilized to determine the award, and in turn provide greater awards.

In a further embodiment, the wager modifications are performed in the background of the game, without ever being displayed to the player. In such an embodiment, from the player's perspective, the award is simply modified and the player may not be aware that his initial wager was ever modified, or in some embodiments, that even any future wager modifiers were ever accrued. It is contemplated that such an embodiment could be less attractive to a player as they are less informed, but the overall effect of providing a bonus-like experience while keeping the player actively playing the game could be achieved. In one possible example of such an embodiment, the gaming system simply determines the award based on the player's current wager, the game outcome associated with the player's wager, and a number of accrued wager modifiers (which in turn were based on a prior wager and the associated prior game outcome that determined the accrued wager modifier), and never displays the modification of the player's current wager. In another possible example, the gaming system determines the award based on the player's current wager, the game outcome based on the current wager, and any accrued wager modifiers, but avoids the step of actually modifying the player's current wager by instead handling the wager modifier via a separate process to determine a separate additional award (by applying the wager modifier determined for that play of the game to that play of the game's outcome), which is then combined with the award associated with the player's wager to form a modified award. Such embodiments, where a future wager modifier is applied to a game outcome, but not necessarily displayed to the player as such, are expressly contemplated herein.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming system comprising:

at least one input device;

at least one display device;

at least one processor; and at least one memory device storing a plurality of instructions, which when executed by the at least one processor, cause the at least one processor to operate with the at least one input device and the at least one display device to:

(i) cause the at least one display device to display a credit meter, wherein the displayed credit meter displays a number of credits which are available to wager;

(ii) determine a first wager placed by a player of the gaming system, wherein for each play:

a. the first wager is a multiple of a minimum wager;

b. the minimum wager is a plurality of credits;

(iii) cause the displayed credit meter to decrement the first wager from the displayed number of credits;

(iv) determine a plurality of primary game symbols to display in a play of a primary game;

(v) cause the at least one display device to display the determined primary game symbols;

(vi) if a winning combination of primary game symbols is displayed, cause the displayed credit meter to be incremented an award amount, wherein the award amount is based on the winning combination and the first wager;

(vii) determine if a future wager modifying event has occurred;

(viii) if a future wager modifying event did occur:

a. determine a future wager modifier, wherein the future wager modifier is a multiple of the minimum wager; and b. cause the display device to display the accrual of the future wager modifier in one of n accrual banks;

(ix) return to at least step (i) if none of the n accrual banks have any displayed accrued future wager modifiers;

(x) cause the display device to display an offer to the player to exchange at least a portion of the displayed accrued future wager modifiers for credits, wherein if a communication is received indicating that the player has accepted the offer:

a. increment the displayed credit meter a first exchange amount which is less than the displayed accrued future wager modifier; and b. decrement the displayed accrued future wager modifier a second exchange amount which is greater than the first exchange amount; and c. return to at least step (i);

(xi) determine a second wager placed by a player of the gaming system, wherein the second wager is, for each play of the game, a multiple of the minimum wager;

(xii) for each of the n accrual banks that have a displayed accrued future wager modifier, determine a wager modifier to apply to the second wager, wherein:

a. the determined wager modifier is a multiple of the minimum wager;

b. the determined wager modifier is less than or equal to the second wager; and c. the determined wager modifier is less than or equal to the displayed future wager modifier associated with that n accrual bank;

(xiii) cause the displayed credit meter to decrement the second wager from the displayed number of credits;

(xiv) cause each of the n accrual banks that have a displayed accrued future wager modifier to decrement an amount equal to the determined wager modifier for that n accrual bank;

(xv) determine a plurality of primary game symbols to display in a play of a primary game;

(xvi) cause the at least one display device to display the determined primary game symbols; and (xvii) if a winning combination of primary game symbols is displayed, cause the displayed credit meter to be incremented a modified award amount, wherein the modified award amount is based on the winning combination, the second wager and each of the determined wager modifiers.

2. The gaming system of claim 1 wherein n is greater than 1.

3. The gaming system of claim 1, wherein the displayed offer is an offer to exchange all of the displayed accrued future wager modifiers for credits.

4. The gaming system of claim 1 wherein the first exchange amount is 50% of the second exchange amount.

5. The gaming system of claim 1 wherein the first exchange amount divided by the second exchange amount results in a number that is: a. less than or equal to a statistically-verified payback percentage associated with the gaming system minus 10 percent; and b. greater than or equal to 30%.

6. The gaming system of claim 1 wherein the minimum wager is greater than 20 credits.

7. The gaming system of claim 1 wherein the future wager modifying event occurs based on the determined primary game symbols including at least one triggering symbol.

8. The gaming system of claim 1 wherein the determined future wager modifier is based at least in part on the first wager.

9. The gaming system of claim 1 wherein the determined future wager modifier is based at least in part on a random determination.

10. The gaming system of claim 1, wherein the determined future wager modifier is determined by: a. determining a plurality of different possible future wager modifiers based on the first wager; and b. selecting one of the determined plurality of different possible future wager modifiers based on a random determination.

11. The gaming system of claim 1 wherein each of the determined wager modifiers are added to the second wager.

12. The gaming system of claim 1 wherein a first determined wager modifier is equal to the second wager and a second determined wager modifier is less than the second wager.

13. The gaming system of claim 1 wherein the at least one memory device and the at least one processor are located within the same gaming system cabinet.

14. A gaming system comprising:

at least one input device;

at least one display device; at least one processor; and at least one memory device storing a plurality of instructions, which when executed by the at least one processor, cause the at least one processor to operate with the at least one input device and the at least one display device to:

(i) determine a first wager placed by a player of the gaming system, wherein for each play:

a. the first wager is a multiple of a first wager amount; and b. the first wager amount is a plurality of credits;

(ii) modify the first wager, regardless of an identity of the player, based at least in part on:

a. at least one randomly determined primary game outcome previously displayed by the at least one display device;

b. a prior wager associated with the at least one previously displayed primary game outcome; and c. the first wager;

(iii) cause the at least one display device to display a primary game outcome;

(iv) determine an award to provide the player based on the displayed primary game outcome and the modified first wager; and (v) provide to the player the determined award.

15. The gaming system of claim 14, wherein the at least one processor is further caused to operate with the at least one input device and the at least one display device to: (i) cause the display device to display a plurality of future wager modifier banks, wherein each displayed future wager modifier bank has a separate value of accrued future wager modifiers; and (ii) for each of the plurality of displayed future wager modifier banks: i. determine at least a portion of the value of accrued future wager modifiers to modify the first wager with; ii. decrement the determined portion from the value of accrued wager modifiers; and iii. modify the first wager with the determined portion.

16. The gaming system of claim 15, wherein the determined portion is added to the first wager.

17. The gaming system of claim 15, wherein the display device is further caused to display each of the separate value of accrued future wager modifiers.

18. The gaming system of claim 17, wherein each of the displayed separate valued of accrued future wager modifiers is displayed numerically.

19. The gaming system of claim 14, wherein the amount that the first wager is modified is less than the first wager.

20. The gaming system of claim 15, wherein for a first displayed future wager modifier bank, the determined portion is equal to the first wager and for a second displayed future wager modifier bank, the determined portion is less than the first wager.

21. A gaming system comprising:

at least one input device;

at least one display device;

at least one processor; and at least one memory device storing a plurality of instructions, which when executed by the at least one processor, cause the at least one processor to operate with the at least one input device and the at least one display device to:

(i) determine a first wager placed by a player of the gaming system, wherein for each play:

a. the first wager is a multiple of a minimum wager amount; and b. the minimum wager amount is a plurality of credits;

(ii) cause the at least one display device to display a primary game outcome (iii) determine a first award to provide the player based on the displayed primary game outcome and the first wager;

(iv) modify the first award, regardless of an identity of the player, based at least in part on:

a. at least one randomly determined primary game outcome previously displayed by the at least one display device;

b. a prior wager associated with the at least one previously displayed primary game outcome; and c. the first wager;

(v) provide to the player the modified first award.

22. A gaming system comprising:

at least one input device;

at least one display device;

at least one processor; and at least one memory device storing a plurality of instructions, which when executed by the at least one processor, cause the at least one processor to operate with the at least one input device and the at least one display device to:

(i) cause the at least one display device to display a credit meter, wherein the displayed credit meter displays a number of credits which are available to wager;

(ii) determine a first wager placed by a player of the gaming system, wherein for each play:

a. the first wager is a multiple of a minimum wager;

b. the minimum wager is a plurality of credits;

(iii) cause the displayed credit meter to decrement the first wager from the displayed number of credits;

(iv) determine a plurality of primary game symbols to display in a play of a primary game;

(v) cause the at least one display device to display the determined primary game symbols;

(vi) if a winning combination of primary game symbols is displayed, cause the displayed credit meter to be incremented an award amount, wherein the award amount is based on the winning combination and the first wager;

(vii) determine if a future wager modifying event has occurred;

(viii) if a future wager modifying event did occur:

a. determine a future wager modifier, wherein the future wager modifier is a multiple of the minimum wager; and b. cause the display device to display the accrual of the future wager modifier in one of n accrual banks;

(ix) return to at least step (i) if none of the n accrual banks have any displayed accrued future wager modifiers;

(x) cause the display device to display an offer to the player to exchange at least a portion of the displayed accrued future wager modifiers for credits, wherein if a communication is received indicating that the player has accepted the offer: a. increment the displayed credit meter a first exchange amount which is less than the displayed accrued future wager modifier; and b. decrement the displayed accrued future wager modifier a second exchange amount which is greater than the first exchange amount; and c. return to at least step (i);

(xi) return to at least step (i).

23. The gaming system of claim 22 wherein the first exchange amount is 50% of the second exchange amount.

24. The gaming system of claim 22 wherein the first exchange amount divided by the second exchange amount results in a number that is:

a. less than or equal to a statistically-verified payback percentage associated with the gaming system minus 10 percent; and b. greater than or equal to 30%.

* * * * *